(12) United States Patent
Xiong et al.

(10) Patent No.: US 12,512,248 B2
(45) Date of Patent: Dec. 30, 2025

(54) POWER CONVERSION MODULE AND MAGNETIC DEVICE THEREOF

(71) Applicant: Delta Electronics, Inc., Taoyuan (TW)

(72) Inventors: Yahong Xiong, Taoyuan (TW); Xueliang Chang, Taoyuan (TW); Junguo Cui, Taoyuan (TW); Kaijian Yang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 964 days.

(21) Appl. No.: 17/528,982

(22) Filed: Nov. 17, 2021

(65) Prior Publication Data
US 2022/0230798 A1    Jul. 21, 2022

(30) Foreign Application Priority Data

Jan. 20, 2021   (CN) .......................... 202110075991.X

(51) Int. Cl.
| | | |
|---|---|---|
| H01F 27/28 | (2006.01) | |
| H01F 27/24 | (2006.01) | |
| H02M 3/00 | (2006.01) | |

(52) U.S. Cl.
CPC ............. *H01F 27/24* (2013.01); *H01F 27/28* (2013.01); *H02M 3/003* (2021.05)

(58) Field of Classification Search
CPC ........ H01F 27/24; H01F 27/28; H01F 27/306; H01F 2027/065; H01F 27/2852; H01F 27/34; H02M 3/003; H02M 1/327; H02M 1/0064; H02M 1/40; H02M 3/1584; H02M 1/00

USPC .................................. 336/221, 83, 170, 232
See application file for complete search history.

(56) References Cited

U.S. PATENT DOCUMENTS

| | | | |
|---|---|---|---|
| 2002/0070836 A1* | 6/2002 | Fujiyoshi | ................ H01F 30/10 336/200 |
| 2004/0108929 A1* | 6/2004 | Ichikawa | ............ H01F 27/2823 336/83 |
| 2009/0219124 A1 | 9/2009 | Young | |
| 2011/0248811 A1 | 10/2011 | Kireev | |

(Continued)

FOREIGN PATENT DOCUMENTS

| | | |
|---|---|---|
| CN | 101030472 A | 9/2007 |
| CN | 103081325 A | 5/2013 |

(Continued)

*Primary Examiner* — Shawki S Ismail
*Assistant Examiner* — Kazi S Hossain
(74) *Attorney, Agent, or Firm* — KIRTON McCONKIE; Evan R. Witt

(57) ABSTRACT

A magnetic device includes a magnetic core assembly, a first winding and a second winding. The magnetic core assembly includes a top surface, a bottom surface, a first lateral side, a second lateral side, a third lateral side, a fourth lateral side, a middle leg and two lateral legs. A first winding groove is defined by the middle leg and one lateral leg. A second winding groove is defined by the middle leg and the other lateral leg. Two opposite ends of the first winding groove are respectively exposed to the first lateral side and the fourth lateral side. Two opposite ends of the second winding groove are respectively exposed to the second lateral side and the third lateral side. At least a part of the first winding is disposed within the first winding groove. At least a part of the second winding is disposed within the second winding groove.

31 Claims, 31 Drawing Sheets

(56) References Cited

U.S. PATENT DOCUMENTS

| | | | | |
|---|---|---|---|---|
| 2014/0266559 A1* | 9/2014 | Yang | ............... | H01F 27/306 |
| | | | | 336/233 |
| 2014/0375409 A1* | 12/2014 | Peng | ............... | H01F 27/325 |
| | | | | 336/198 |
| 2020/0412272 A1* | 12/2020 | Raimann | ............. | H02M 7/23 |

FOREIGN PATENT DOCUMENTS

| CN | 103141021 A | 6/2013 |
|---|---|---|
| CN | 104980003 A | 10/2015 |
| CN | 109390118 A | 2/2019 |
| CN | 208622565 U | 3/2019 |

* cited by examiner

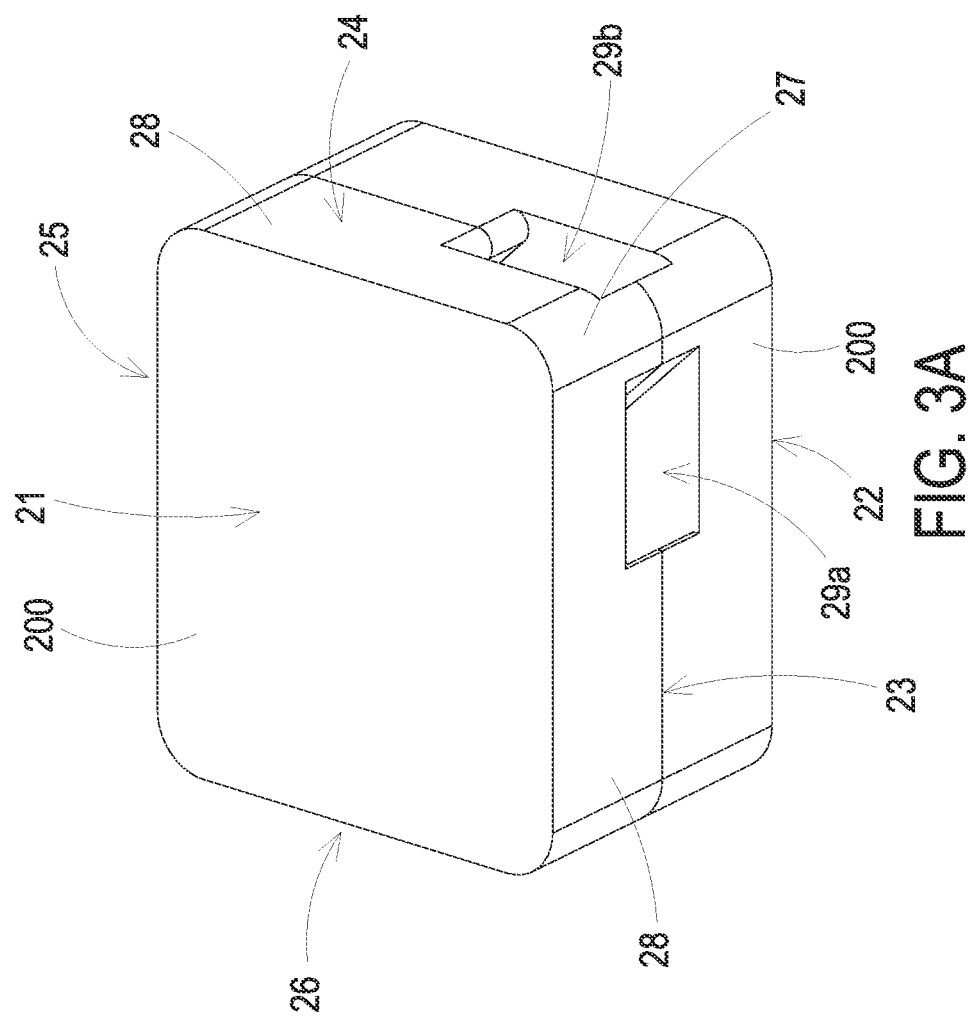

23a

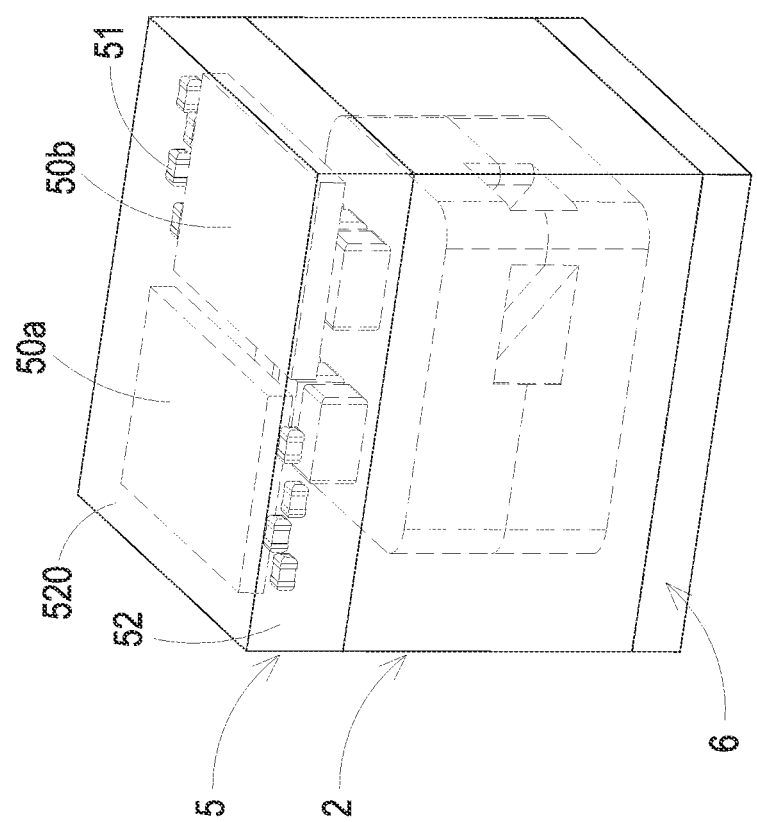

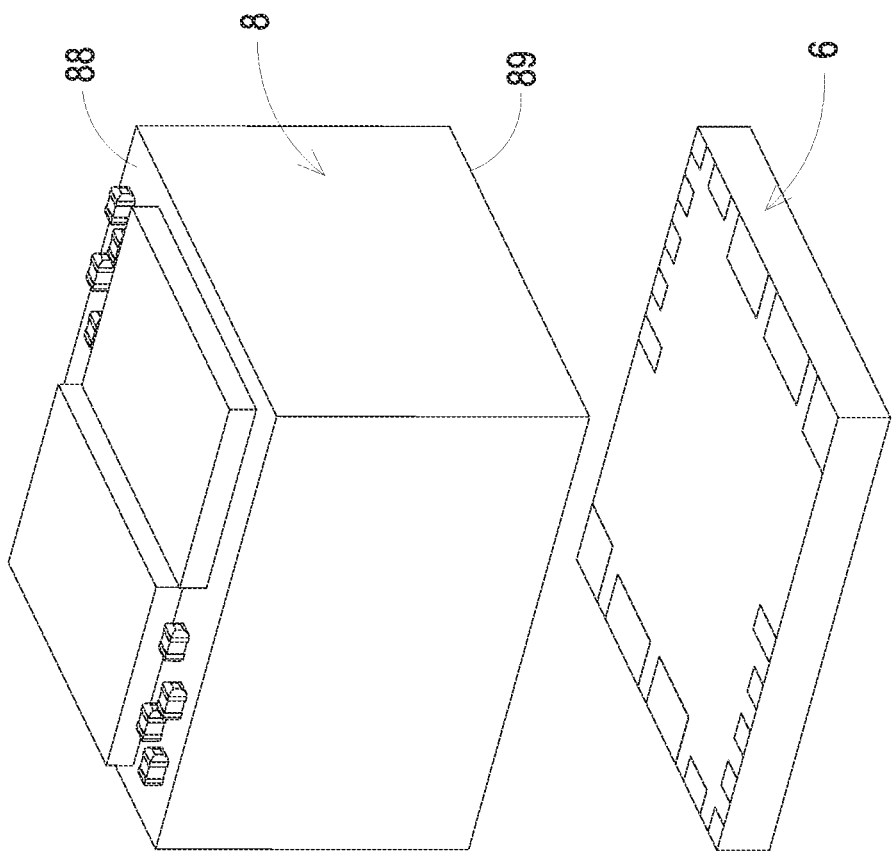

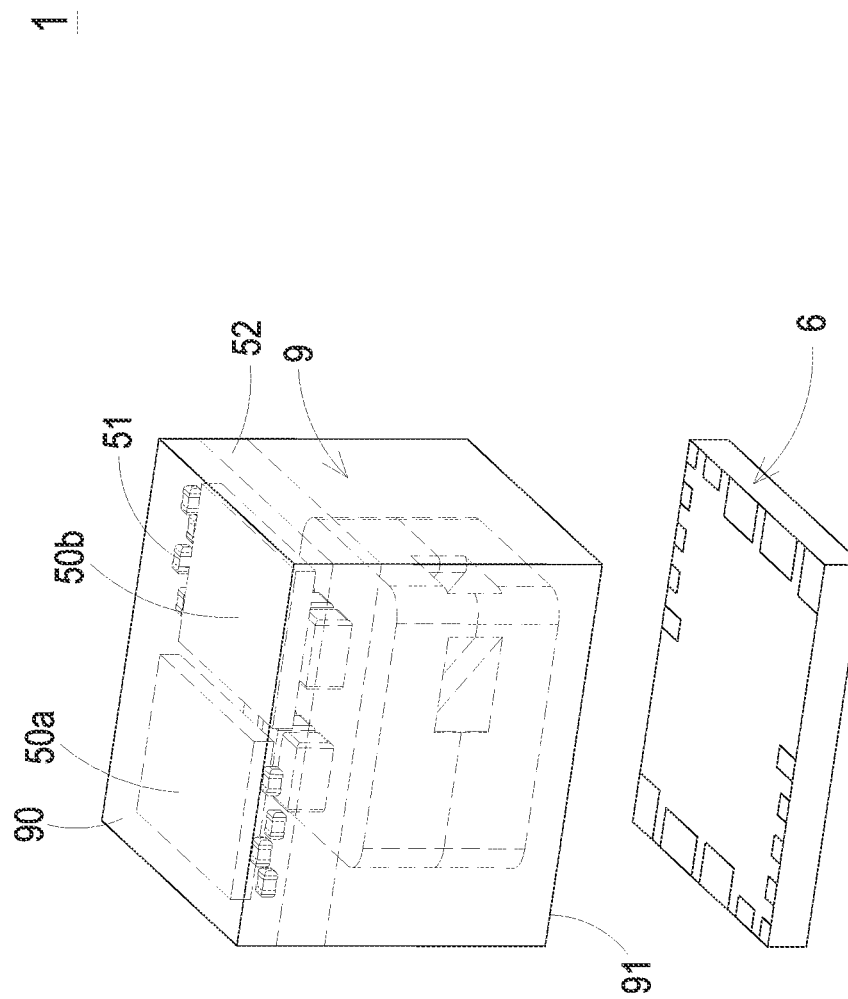

POWER CONVERSION MODULE AND MAGNETIC DEVICE THEREOF

CROSS-REFERENCE TO RELATED APPLICATION

This application claims priority to China Patent Application No. 202110075991.X, filed on Jan. 20, 2021, the entire content of which is incorporated herein by reference for all purposes.

FIELD OF THE INVENTION

The present disclosure relates to a power electronic device, and more particularly to a power conversion module and a magnetic device thereof.

BACKGROUND OF THE INVENTION

Nowadays, power electronic devices are used as important parts of power conversion and widely used in power, electronics, electrical and energy industries. It is an important goal for those skilled in the art to ensure the long-term stable operations of the power electronic devices and improve the power conversion efficiency of the power electronic devices.

With the rapid development of mobile communication technologies and cloud computing technologies, high-power DC/DC power conversion modules have also been widely used in communication products. Due to the high power and miniaturization of the communication products, it is a challenge to increase the power conversion efficiency of the power conversion module and reduce the volume of the power conversion module. Therefore, how to design a reasonable structure and layout for the power conversion module, improve the power conversion efficiency of the power conversion module and reduce the volume of the power conversion module is one of the important issues in this technical field.

For reducing the volume of the output filter and expanding the system output power, the conventional power conversion module usually uses a parallel-connected circuit topology. That is, the conventional power conversion module includes two power conversion circuits connected in parallel. For example, the conventional power conversion module includes two buck-type power conversion circuits connected in parallel. In order to optimize the ripple characteristics of the output current of a plurality of parallel-connected circuits, a magnetic integration technology is used to make a plurality of inductors in the two power conversion circuits of the power conversion module to form a magnetic integration coupling relationship. That is, two inductors of the two power conversion circuits are formed as two coupled inductors.

In accordance with the magnetic integration technology, the magnetic device of the conventional power conversion module is usually equipped with an E-shaped core. The E-shaped core has two winding grooves. The two opposite ends of each winding groove are exposed to two opposite lateral sides of the E-shaped core. Since the installation positions of the two coupled inductors formed by two windings and the E-shaped core are different, the distances from the two coupled inductors to the output terminal of the power conversion module respectively are different. Under this circumstance, the equivalent series resistances of the two coupled inductors are not symmetric, and the currents flowing through the two coupled inductors are not uniformly distributed. Since the DC magnetic fluxes flowing through the lateral legs of the E-shaped core are larger, the lateral legs of the E-shaped core are readily subjected to magnetic saturation. In other words, it is difficult to increase the performance of the power conversion module.

Therefore, the present disclosure provides a power conversion module and a magnetic device of the power conversion module in order to overcome the drawbacks of the conventional technologies.

SUMMARY OF THE INVENTION

An object of the present disclosure provides a power conversion module to address the issues encountered by the prior arts. As previously described for the conventional power conversion module, the two opposite ends of each winding groove are exposed to two opposite lateral sides of the E-shaped core, the installation positions of the two coupled inductors formed by two windings and the E-shaped core are different, and the distances from the two coupled inductors to the output terminal of the power conversion module respectively are different. Under this circumstance, the equivalent series resistances of the two coupled inductors are not symmetric, and the currents flowing through the two coupled inductors are not uniformly distributed. Since the DC magnetic fluxes flowing through the lateral legs of the E-shaped core are larger, the lateral legs of the E-shaped core are readily subjected to magnetic saturation. It is difficult to increase the performance of the power conversion module.

In accordance with an aspect of the present disclosure, a magnetic device is provided. The magnetic device includes a magnetic core assembly, a first winding and a second winding. The magnetic core assembly includes a top surface, a bottom surface, a first lateral side, a second lateral side, a third lateral side, a fourth lateral side, a middle leg and two lateral legs. The first lateral side, the second lateral side, the third lateral side and the fourth lateral side are disposed between the top surface and the bottom surface. The first lateral side and the third lateral side are opposed to each other. The second lateral side and the fourth lateral side are opposed to each other. The middle leg is disposed between the two lateral legs. A first winding groove is defined by the middle leg and one of the two lateral legs collaboratively. A second winding groove is defined by the middle leg and the other of the two lateral legs collaboratively. Moreover, two opposite ends of the first winding groove are respectively exposed to the first lateral side and the fourth lateral side, and two opposite ends of the second winding groove are respectively exposed to the second lateral side and the third lateral side. At least a part of the first winding is disposed within the first winding groove. At least a part of the second winding is disposed within the second winding groove.

In accordance with another aspect of the present disclosure, a power conversion module is provided. The power conversion module includes a magnetic device and a power device. The magnetic device includes a main frame, a magnetic core assembly and a conductive structure. The main frame has a first surface and a second surface, which are opposed to each other. The magnetic core assembly includes a top surface, a bottom surface, a first lateral side, a second lateral side, a third lateral side, a fourth lateral side, a middle leg and two lateral legs. The first lateral side, the second lateral side, the third lateral side and the fourth lateral side are disposed between the top surface and the bottom surface. The first lateral side and the third lateral side are opposed to each other. The second lateral side and the fourth lateral side are opposed to each other. The middle leg is disposed between the two lateral legs. A first winding groove is defined by the middle leg and one of the two lateral legs collaboratively. A second winding groove is defined by the middle leg and the other of the two lateral legs collaboratively. Moreover, two opposite ends of the first winding groove are respectively exposed to the first lateral side and the fourth lateral side, and two opposite ends of the second winding groove are respectively exposed to the second lateral side and the third lateral side. The conductive structure is embedded between the first surface and the second surface of the main frame. The conductive structure is partially exposed to the first lateral side, the second lateral side, the third lateral side or the fourth lateral side of the magnetic core assembly. A portion of the conductive structure is formed as a first winding and a second winding. Moreover, at least a part of the first winding is disposed within the first winding groove, and at least a part of the second winding is disposed within the second winding groove. The power device is disposed on the first surface of the main frame. The power device includes at least one power component. The at least one power component is electrically connected with the conductive structure. A direction of a current flowing the first winding and a direction of a current flowing through the second winding are opposite.

From the above descriptions, the present disclosure provides the power conversion module and the magnetic device. In one embodiment, the magnetic core assembly of the magnetic device is specially designed. That is, the two opposite ends of the first winding groove are respectively exposed to the first lateral side and the fourth lateral side. The two opposite ends of the second winding groove are respectively exposed to the second lateral side and the third lateral side. In other words, the two opposite ends of the first winding groove and the two opposite ends of the second winding groove are exposed to four different lateral sides of the magnetic core assembly, respectively. After the two windings are disposed within the two winding grooves to be formed as the coupled inductors, the coupled inductors can be distributed more uniformly. Consequently, the distances of the output terminals from the two coupled inductors to the output positive terminal of the power conversion module respectively are nearly equal. Consequently, the asymmetry of the equivalent series resistances of the two coupled inductors is reduced, and the currents flowing through the two coupled inductors are nearly equal. Since the DC magnetic fluxes flowing through the lateral legs of the magnetic core assembly are reduced, the lateral legs of the magnetic core assembly are not readily subjected to magnetic saturation. Consequently, the performance of the power conversion module is enhanced.

The above contents of the present disclosure will become more readily apparent to those ordinarily skilled in the art after reviewing the following detailed description and accompanying drawings, in which:

BRIEF DESCRIPTION OF THE DRAWINGS

FIG. 3A is a schematic assembled view illustrating a first exemplary structure of a magnetic core assembly of the power conversion module according to the first embodiment of the present disclosure;

FIG. 11A is a schematic perspective view illustrating a power conversion module according to a third embodiment of the present disclosure;

FIG. 14A is a schematic exploded view illustrating the power conversion module as shown in FIG. 13A;

FIG. 16A is a schematic exploded view illustrating the power conversion module as shown in FIG. 15A;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
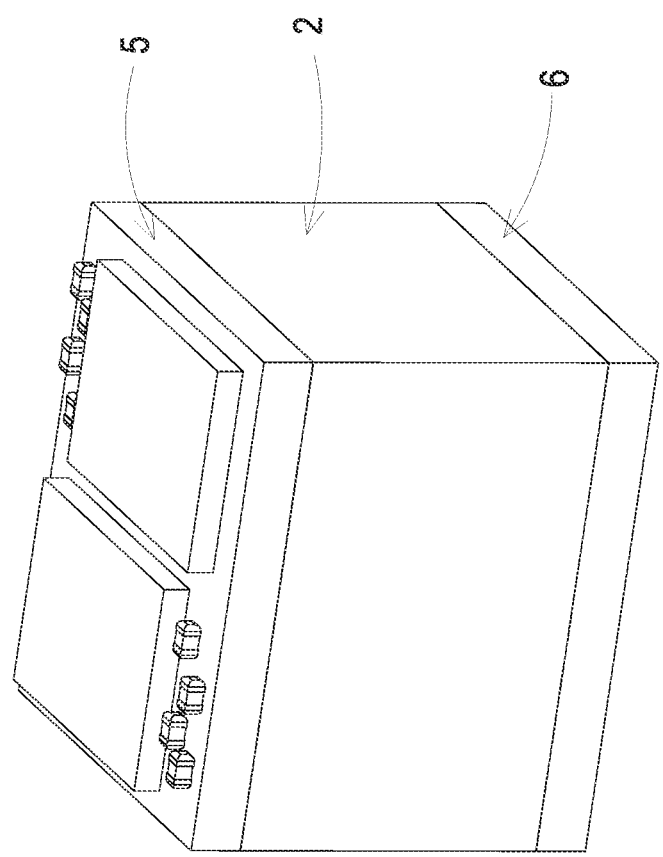
FIG. 1A is a schematic assembled view illustrating a power conversion module according to a first embodiment of the present disclosure.
Figure 1B:
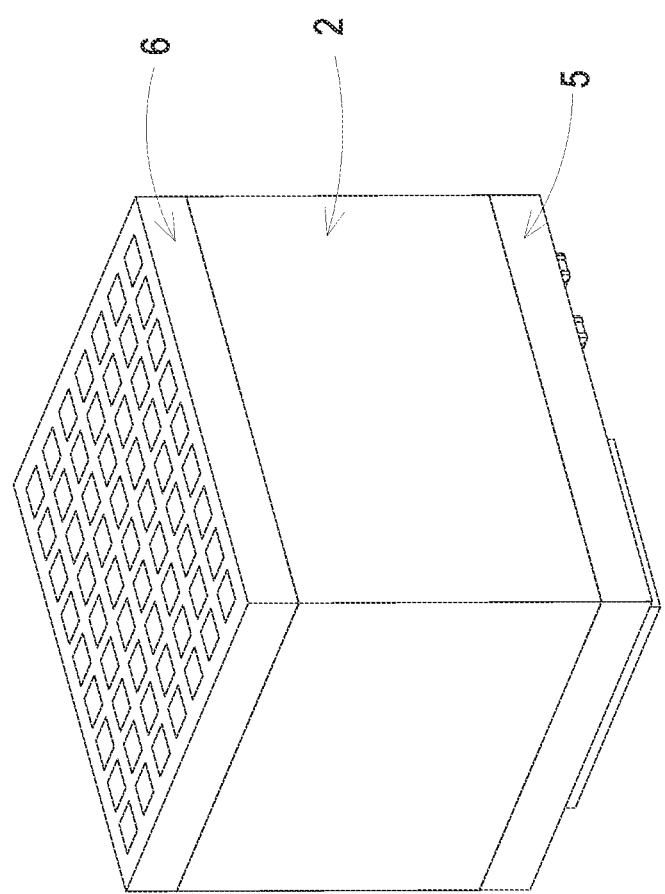
FIG. 1B is a schematic assembled view illustrating the power conversion module as shown in FIG. 1A and taken along another viewpoint.
Figure 2A:
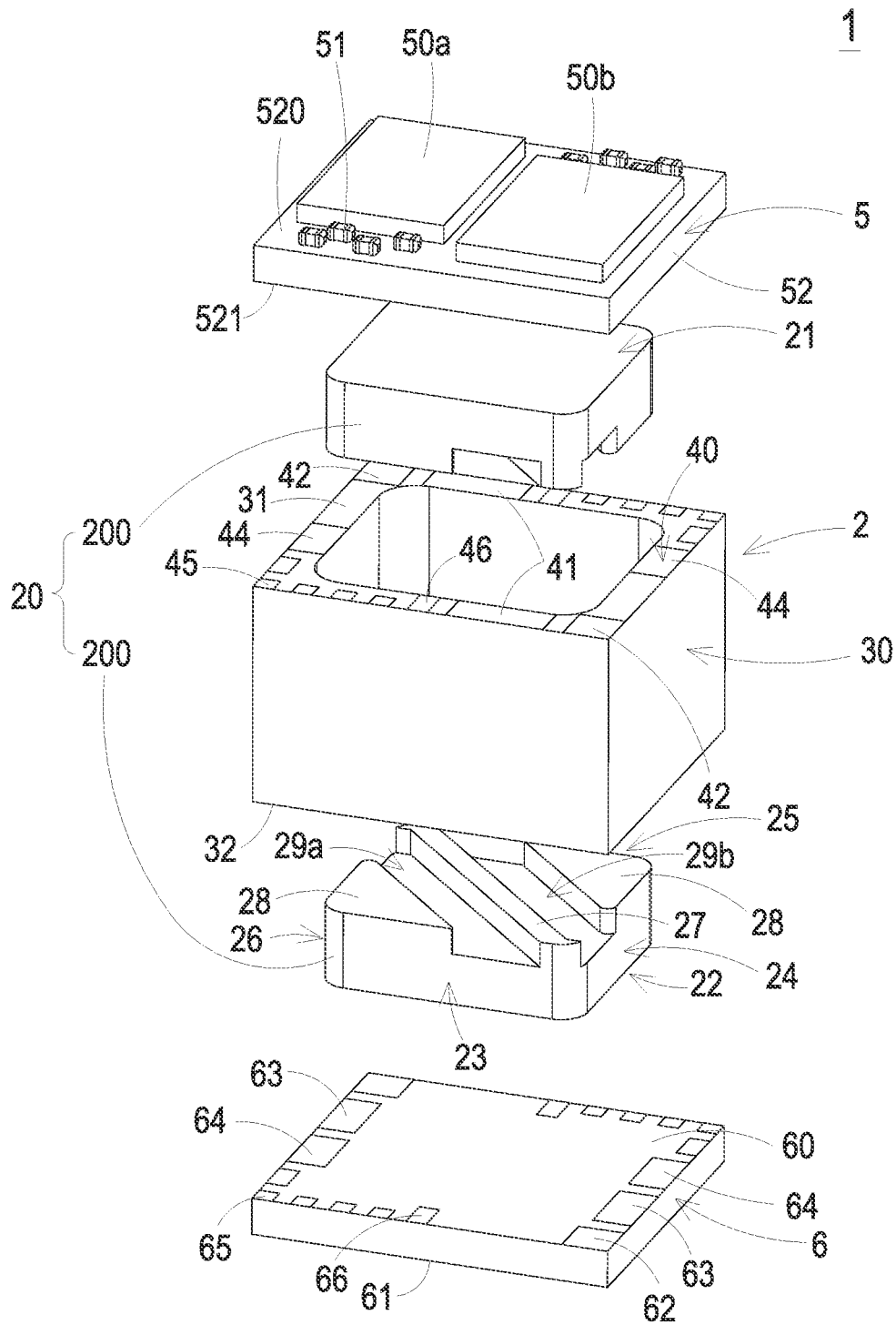
FIG. 2A is a schematic exploded view illustrating the power conversion module as shown in FIG. 1A.
Figure 2B:
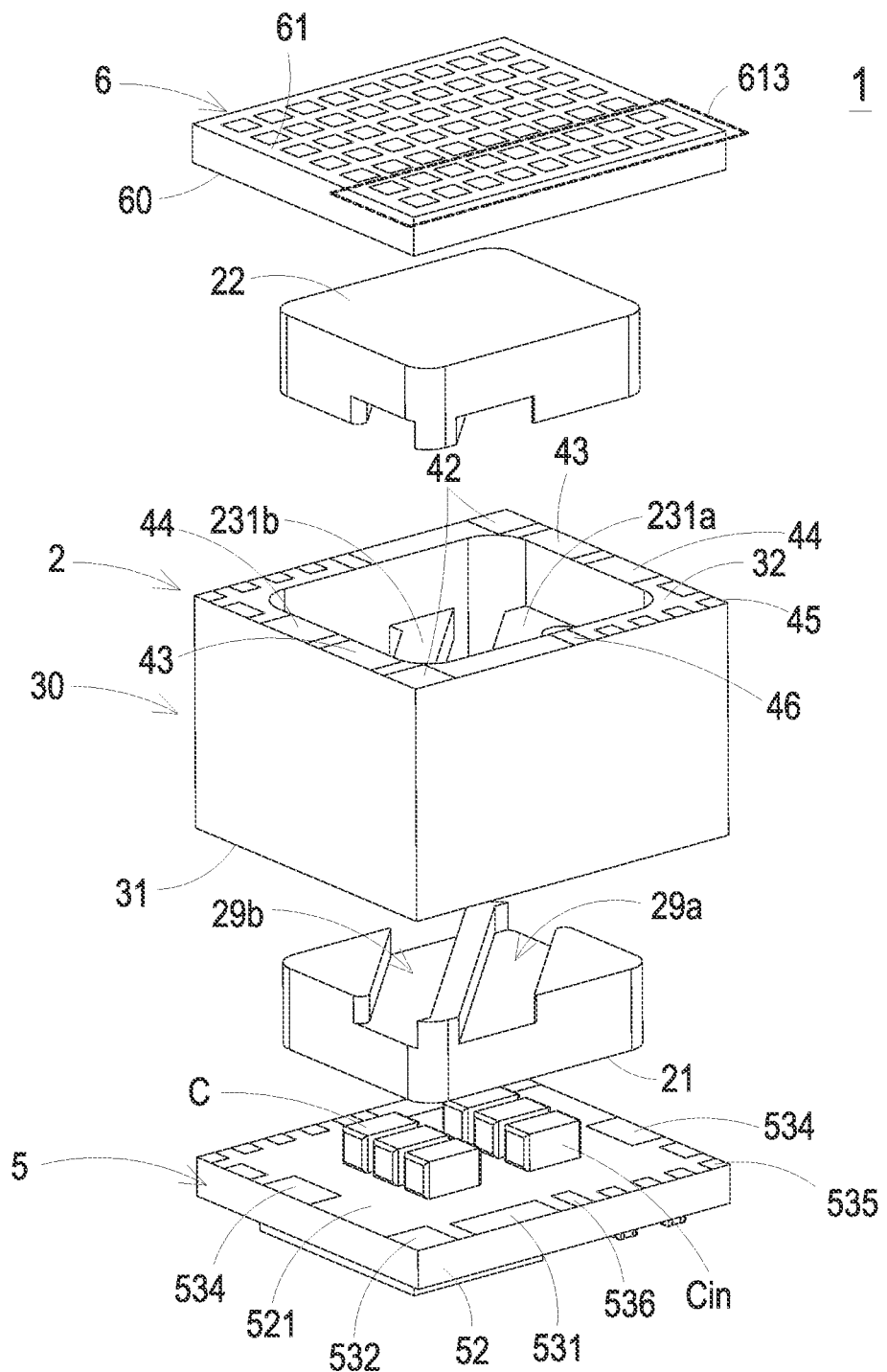
FIG. 2B is a schematic exploded view illustrating the power conversion module as shown in FIG. 2A and taken along another viewpoint.
Figure 3B:
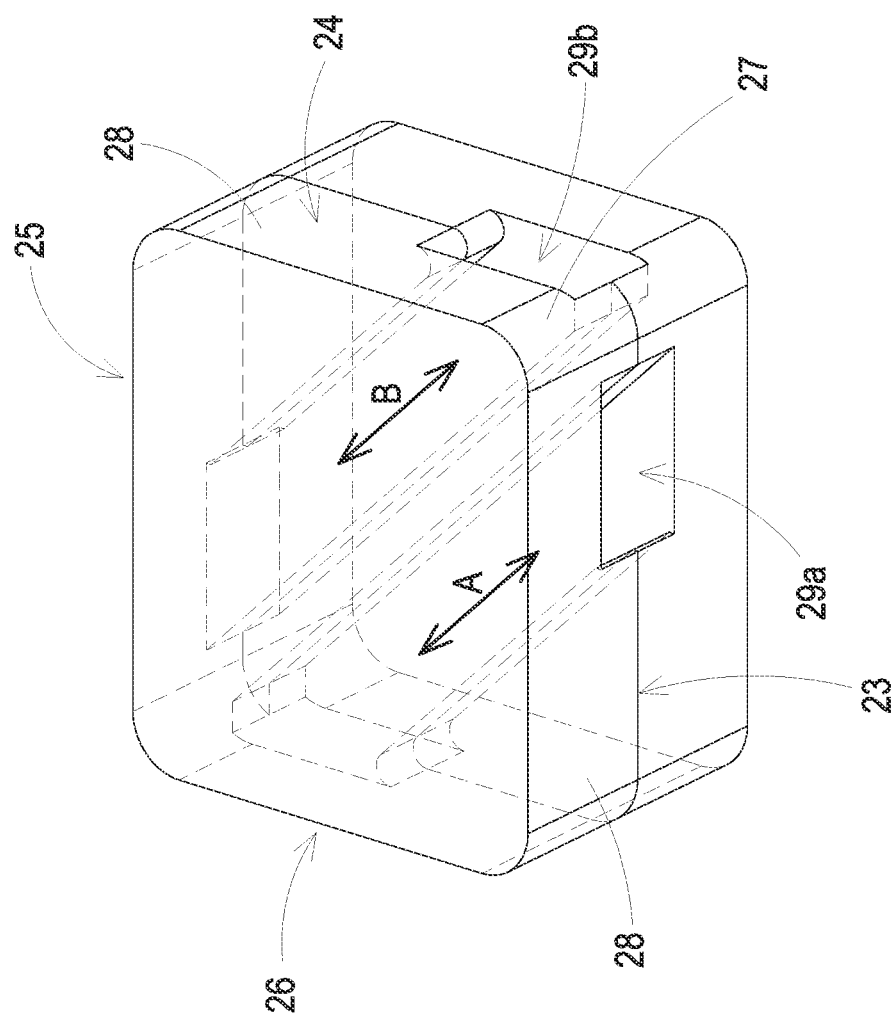
FIG. 3B is a schematic perspective view illustrating the magnetic core assembly as shown in FIG. 3A.
Figure 4:
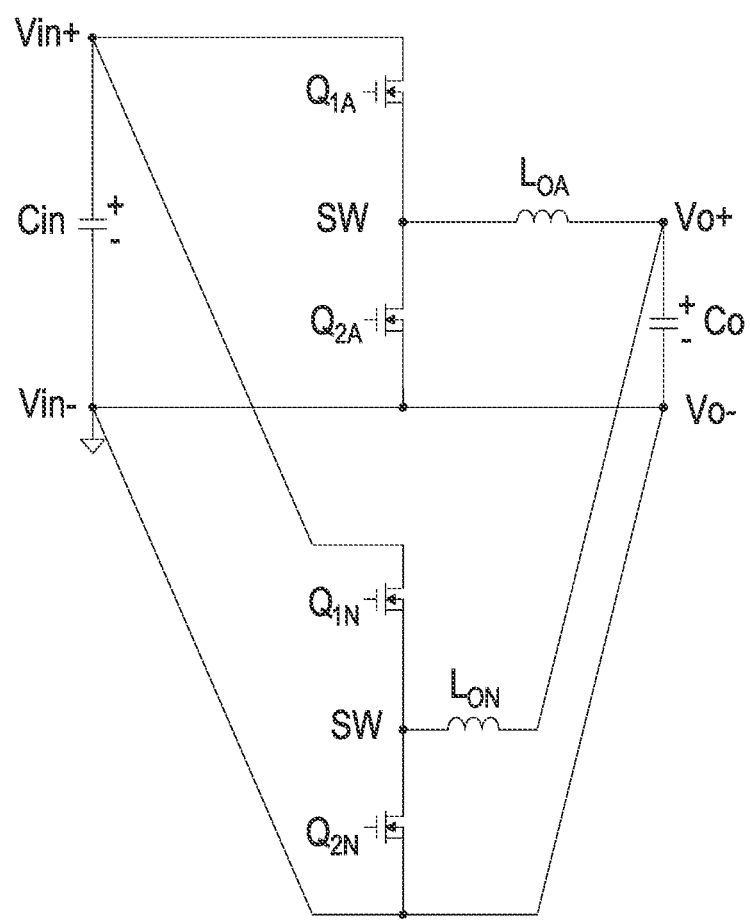
FIG. 4 is a schematic circuit diagram illustrating a circuitry structure of the power conversion module according to the first embodiment of the present disclosure.

FIG. 1A is a schematic assembled view illustrating a power conversion module according to a first embodiment of the present disclosure. FIG. 1B is a schematic assembled view illustrating the power conversion module as shown in FIG. 1A and taken along another viewpoint. FIG. 2A is a schematic exploded view illustrating the power conversion module as shown in FIG. 1A. FIG. 2B is a schematic exploded view illustrating the power conversion module as shown in FIG. 2A and taken along another viewpoint. FIG. 3A is a schematic assembled view illustrating a first exemplary structure of a magnetic core assembly of the power conversion module according to the first embodiment of the present disclosure. FIG. 3B is a schematic perspective view illustrating the magnetic core assembly as shown in FIG. 3A. FIG. 4 is a schematic circuit diagram illustrating a circuitry structure of the power conversion module according to the first embodiment of the present disclosure. As shown in FIGS. 1 to 4, the power conversion module 1 includes two buck-type power conversion circuits, which are connected with each other in parallel. The power conversion module 1 includes a magnetic device 2 and a power device 5.

The magnetic device 2 includes a magnetic core assembly 20, a first winding 231a and a second winding 231b.

The magnetic core assembly 20 includes a top surface 21, a bottom surface 22, a first lateral side 23, a second lateral side 24, a third lateral side 25, a fourth lateral side 26, a middle leg 27 and two lateral legs 28. The top surface 21 and the bottom surface 22 are opposed to each other. The first lateral side 23, the second lateral side 24, the third lateral side 25 and the fourth lateral side 26 are disposed between the top surface 21 and the bottom surface 22. The first lateral side 23 and the third lateral side 25 are opposed to each other. The second lateral side 24 and the fourth lateral side 26 are opposed to each other. The second lateral side 24 and the fourth lateral side 26 are disposed between the first lateral side 23 and the third lateral side 25. The term "two opposed lateral sides" generally refers to that at least one lateral side is formed between the two opposed lateral sides. Preferably but not exclusively, at least one lateral side of the two opposed lateral sides has a flat surface or a curved surface. The middle leg 27 is disposed between the two lateral legs 28. A first winding groove 29a is defined by the middle leg 27 and one of the two lateral legs 28 collaboratively. A second winding groove 29b is defined by the middle leg 27 and the other of the two lateral legs 28 collaboratively. The two opposite ends of the first winding groove 29a are exposed to the first lateral side 23 and the fourth lateral side 26, respectively. The two opposite ends of the second winding groove 29b are exposed to the second lateral side 24 and the third lateral side 25, respectively.

At least a part of the first winding 231a is disposed within the first winding groove 29a. At least a part of the second winding 231b is disposed within the second winding groove 29b. The directions of the currents flowing through the first winding 231a and the second winding 231b are opposite. Consequently, the DC magnetic fluxes are superimposed, and the AC magnetic fluxes are cancelled out. In this way, the current ripple is largely decreased, and the equivalent inductance is largely increased. In the embodiment of FIG. 4, the first winding 231a and the second winding 231b are collaboratively formed as two coupled inductors $L_{OA}$ and $L_{ON}$. In other embodiment, the two windings 231a and 231b and the magnetic core assembly 20 are collaboratively formed as a transformer.

In an embodiment, the magnetic device 2 further includes a main frame 30 and a conductive structure 40. For example, the main frame 30 has a hollow box structure or a board structure. In addition, the shape of the main frame 30 matches the shape of the magnetic core assembly 20. The main frame 30 has a first surface 31 and a second surface 32, which are opposed to each other. The magnetic core assembly 20 is disposed within the main frame 30. The top surface 21 of the magnetic core assembly 20 is located beside the first surface 31 of the main frame 30. The bottom surface 22 of the magnetic core assembly 20 is located beside the second surface 32 of the main frame 30. The conductive structure 40 is embedded in the main frame 30 and disposed between the first surface 31 and the second surface 32 of the main frame 30. The conductive structure 40 is arranged around the magnetic core assembly 20, and partially exposed to the first lateral side 23, the second lateral side 24, the third lateral side 25 and the fourth lateral side 26 of the magnetic core assembly 20. In addition, a portion of the conductive structure 40 is formed as the two windings 231a and 231b.

The power device 5 has a plate structure. In an embodiment, the power device 5 is attached on the first surface 31 of the main frame 30. In addition, the power device 5 includes at least one power component, e.g., two power components 50a and 50b. Each of the power components 50a and 50b include a half-bridge arm with two switches. As shown in FIG. 4, the power component 50a includes a half-bridge arm with two switches $Q_{1A}$ and $Q_{2A}$, and the power component 50b includes a half-bridge arm with two switches $Q_{1N}$ and $Q_{2N}$. Each half-bridge arm is electrically connected with an input capacitor Cin. The power device 5 further includes a controller 51 and a circuit board 52. The circuit board 52 has a first surface 520 and a second surface 521, which are opposed to each other. The second surface 521 of the circuit board 52 is located beside the first surface 31 of the main frame 30. The controller 51 and the power components 50a and 50b are disposed on the first surface 520 of the circuit board 52. The controller 51 can control the operations of the power components 50a and 50b.

In an embodiment, the two power components 50a and 50b are symmetrically disposed on the first surface 520 of the circuit board 52 along a diagonal line. In an embodiment, the two power components 50a and 50b are located at the topmost side of the power conversion module 1 in order to facilitate the installation of a heat sink (not shown). Moreover, at least one power component contact pad 531, at least one input positive terminal contact pad 532, at least one output negative terminal contact pad 534, at least one control signal contact pad 535 and at least one feedback signal contact pad 536 are disposed on the second surface 521 of the circuit board 52. The at least one power component contact pad 531 is electrically connected with the power component pins SW of the power components 50a and 50b. The input positive terminal contact pad 532 is used as an input positive terminal Vin+. The output negative terminal contact pad 534 is used as an output negative terminal Vo− (i.e., the ground terminal GND of the power conversion module 1). The control signal contact pad 535 is used for transferring control signals. The feedback signal contact pad 536 is used for transferring sampling signals.

In an embodiment, the power conversion module 1 further includes a pin layer 6. The pin layer 6 is located beside the second surface 32 of the main frame 30. In addition, the pin layer 6 is attached on the bottom surface 22 of the magnetic core assembly 20. The pin layer 6 has a first surface 60 and a second surface 61, which are opposed to each other. The pin layer 6 includes at least one input positive terminal 62, at least one output positive terminal 63, at least one output negative terminal 64, at least one control signal pin 65 and at least one feedback signal pin 66, which are disposed on the first surface 60 of the pin layer 6. The at least one input positive terminal 62 is used as the input positive terminal Vin+. The output negative terminal 64 is used as the output negative terminal Vo− (i.e., the ground terminal GND of the power conversion module 1). The output positive terminal 63 is used as an output positive terminal Vo+. These terminals 62, 63 and 64 are electrically connected with corresponding external pins that are disposed on the second surface 32 of the main frame 30. Consequently, the power conversion module 1 can be electrically connected with an external circuit. The control signal pin 65 is used for transferring control signals. The feedback signal pin 66 is used for transferring sampling signals.

In an embodiment, the power conversion module 1 further includes an input capacitor Cin. The input capacitor Cin is connected between the input positive terminal and the input negative terminal of the power conversion module 1. It is preferred that the input capacitor Cin is located near the power components 50a and 50b. In an embodiment, the input capacitor Cin is disposed between the power device 5 and the magnetic device 2. For example, the input capacitor Cin is disposed on the second surface 521 of the circuit board 52 of the power device 5 and disposed between the power device 5 and the magnetic core assembly 20 of the magnetic device 2. Alternatively, the input capacitor Cin is disposed between the power device 5 and the main frame 30 of the magnetic device 2. Generally, during the switching processes of the power components 50a and 50b, the parasitic parameters between the input capacitor Cin and the power components 50a, 50b and the power components equivalent parameters may result in high-frequency parasitic oscillation. The high-frequency parasitic oscillation affects the switching processes and the power loss of the power components 50a and 50b. Since the input capacitor Cin is located near the power components 50a and 50b, the influence of the parasitic parameters can be reduced. In this way, the volume of the power conversion module 1 can be reduced, and the overall power density of the power conversion module 1 can be increased. For reducing the distributed inductance between the input capacitor Cin and each half-bridge arm, the input capacitor Cin is disposed between the two half-bridge arms and the two coupled inductors. Moreover, the projection region of the input capacitor Cin with respect to the horizontal plane and the projection region of the magnetic core assembly 20 with respect to the horizontal plane are partially overlapped with each other.

In an embodiment, the power conversion module 1 further includes an output capacitor Co. Preferably, the output capacitor Co is disposed between the magnetic device 2 and the pin layer 6. It is noted that the installation position of the output capacitor Co is not restricted. For example, in other embodiment, the output capacitor Co is disposed on a system board (not shown). That is, the output capacitor Co is located outside the power conversion module 1. In an embodiment, the second terminal of the output capacitor Co is connected with the output positive terminal 63, and the first terminal of the output capacitor Co is connected with the output negative terminal 64.

As previously described, the magnetic device of the conventional power conversion module is usually equipped with an E-shaped core, and the E-shaped core has two winding grooves. Since two opposite ends of each winding groove are exposed to two opposite lateral sides of the E-shaped core, some drawbacks occur. In one embodiment, the magnetic core assembly 20 of the magnetic device 2 of the power conversion module 1 is specially designed. That is, the two opposite ends of the first winding groove 29a are respectively exposed to the first lateral side 23 and the fourth lateral side 26, and the two opposite ends of the second winding groove 29b are respectively exposed to the second lateral side 24 and the third lateral side 25. In other words, the two opposite ends of the first winding groove 29a and the two opposite ends of the second winding groove 29b are exposed to four different lateral sides of the magnetic core assembly 20, respectively. After the two windings 231a and 231b are disposed within the two winding grooves 29a and 29b to be formed as the coupled inductors, the coupled inductors can be distributed more uniformly. Consequently, the distances from the output terminals of the two coupled inductors (e.g., the output positive terminal contact surfaces 43) to the output positive terminal Vo+ of the power conversion module 1 (e.g., the output terminal 613 as shown in FIG. 2B) are nearly equal. In addition, the asymmetry of the equivalent series resistances of the two coupled inductors is reduced, and the currents flowing through the two coupled inductors are nearly equal. Since the DC magnetic fluxes flowing through the lateral legs of the magnetic core assembly are reduced, the lateral legs of the magnetic core assembly are not readily subjected to magnetic saturation. Consequently, the performance of the power conversion module 1 is enhanced.

Moreover, the first terminal of the first winding 231a is electrically connected with one of the two power components 50a and 50b (i.e., one of the two half-bridge arms), and the first terminal of the second winding 231b is electrically connected with the other of the two power components 50a and 50b (i.e., the other of the two half-bridge arms). Moreover, the projection region of one half-bridge arm with respect to the circuit board 52 and the projection region of the other half-bridge arm with respect to the circuit board 52 are partially overlapped with each other.

In this embodiment, the magnetic core assembly 20 has a hexahedral structure. That is, a second side of the first lateral side 23 is connected with a first side of the second lateral side 24, a second side of the second lateral side 24 is connected with a first side of the third lateral side 25, a second side of the third lateral side 25 is connected with a first side of the fourth lateral side 26, and a second side of the fourth lateral side 26 is connected with a first side of the first lateral side 23. Preferably but not exclusively, the angle between the first lateral side 23 and the second lateral side 24 or the angle between the first lateral side 23 and the fourth lateral side 26 is smaller than or equal to 120 degrees. Preferably but not exclusively, the first winding groove 29a and the second winding groove 29b are in parallel with each other. As shown in FIG. 3B, the line A passing through the two opposite ends of the first winding groove 29a are not perpendicular to the first lateral side 23 and the fourth lateral side 26, and the line B passing through the two opposite ends of the second winding groove 29b are not perpendicular to the second lateral side 24 and the third lateral side 25.

Figure 5A:
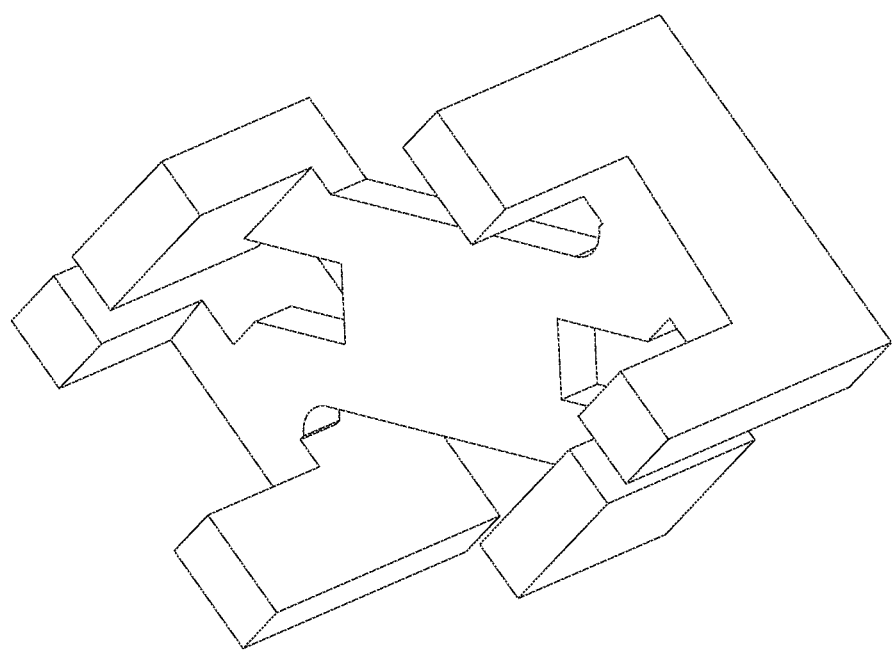
FIG. 5A schematically illustrates a pre-formed structure of the conductive structure in the power conversion module according to the first embodiment of the present disclosure.
Figure 5B:
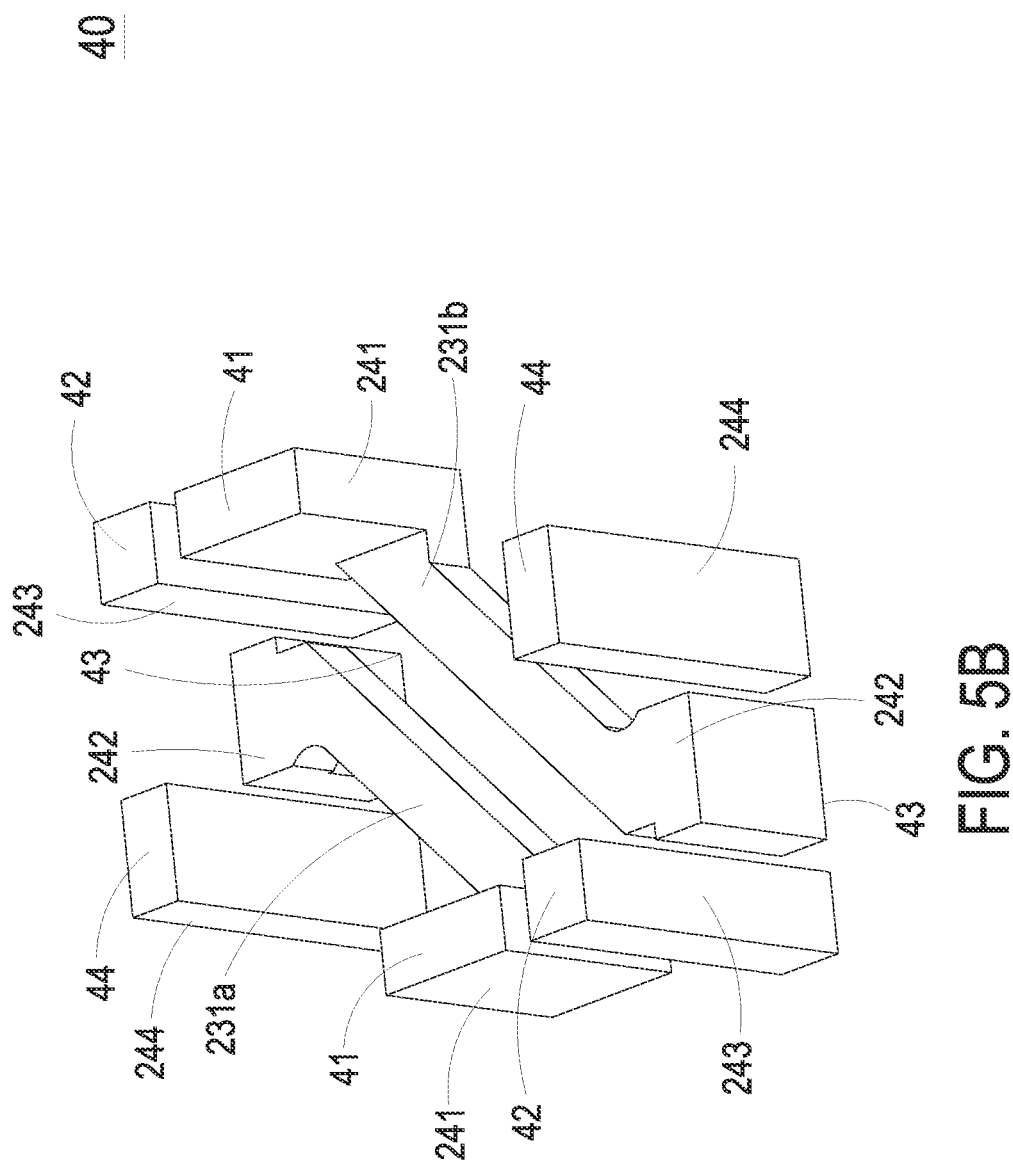
FIG. 5B schematically illustrates the conductive structure in the power conversion module according to the first embodiment of the present disclosure.

FIG. 5A schematically illustrates a pre-formed structure of the conductive structure in the power conversion module according to the first embodiment of the present disclosure. FIG. 5B schematically illustrates the conductive structure in the power conversion module according to the first embodiment of the present disclosure. In accordance with a feature of the present disclosure, the conductive structure 40 includes at least one copper layer or at least one copper block, and the conductive structure 40 is previously embedded in the main frame 30. As shown in FIG. 5A, a pre-formed structure 23a (e.g., a copper block) is embedded in a circuit board (not shown). After the pre-formed structure 23a undergoes a controlled deep milling process, the pre-formed structure 23a is milled as the conductive structure 40 as shown in FIG. 5B.

Please refer to FIG. 5B. The conductive structure 40 includes two first connection parts 241 and two second connection parts 242. The first connection parts 241 and the two second connection parts 242 are embedded in at least two sidewalls of the main frame 30 and disposed between the first surface 31 and the second surface 32 of the main frame 30. The first winding 231a and the second winding 231b are connected between the corresponding first connection parts 241 and the corresponding second connection parts 242, respectively. The first end surfaces of the first connection parts 241 are partially exposed to the first surface 31 of the main frame 30 and formed as power component terminal contact surfaces 41. The power component terminal contact surfaces 41 are connected with the power component pins SW of the power components 50a and 50b. The second end surfaces of the first connection parts 241 are selectively exposed to the second surface 32 of the main frame 30. The second end surfaces of the second connection parts 242 are partially exposed to the second surface 32 of the main frame 30 and formed as the output positive terminal contact surfaces 43 of the power conversion module 1. The output positive terminal contact surfaces 43 are connected with the output positive terminal Vo+ of the power conversion module 1 and connected with the second terminal of the output capacitor Co. The first end surfaces of the second connection parts 242 are selectively exposed to the first surface 31 of the main frame 30, but not limited thereto.

In an embodiment, the first surface 31 of the main frame 30 is higher than the top surface 21 of the magnetic core assembly 20, and the second surface 32 of the main frame 30 is lower than the bottom surface 22 of the magnetic core assembly 20. In an embodiment, the conductive structure 40 and the main frame 30 are integrated as a one-piece structure by using a plastic molding process. Preferably but not exclusively, the main frame 30 is made of epoxy resin or PCB material.

The conductive structure 40 further includes two third connection parts 243 and two fourth connection parts 244. The two third connection parts 243 and the two fourth connection parts 244 are embedded in at least two sidewalls of the main frame 30 and disposed between the first surface 31 and the second surface 32 of the main frame 30. The first end surfaces of the third connection parts 243 are partially exposed to the first surface 31 of the main frame 30 and formed as input positive terminal contact surfaces 42. The first end surfaces of the fourth connection parts 244 are partially exposed to the first surface 31 of the main frame 30 and formed as output negative terminal contact surfaces 44. The second end surfaces of the third connection parts 243 are partially exposed to the second surface 32 of the main frame 30 and formed as the input positive terminal contact surfaces 42. The second end surfaces of the fourth connection parts 244 are partially exposed to the second surface 32 of the main frame 30 and formed as the output negative terminal contact surfaces 44. The input positive terminal contact surfaces 42 are connected with the input positive terminal Vin+. The output negative terminal contact surfaces 44 are connected with the output negative terminal Vo−. In addition, the output negative terminal contact surfaces 44 are connected with the GND mesh of the power device 5 and connected with the GND mesh of the pin layer 6.

The conductive structure 40 further includes some additional connection parts. The first end surfaces of the additional connection parts are partially exposed to the first surface 31 of the main frame 30. The second end surfaces of the additional connection parts are partially exposed to the second surface 32 of the main frame 30. Consequently, control signal pin contact surfaces 45 and feedback signal pin contact surfaces 46 (see FIG. 2A) are formed. The power device 5 and the pin layer 6 of the power conversion module 1 (or the at least one power component and the system board) are in communication with each other through the control signal pin contact surfaces 45. The feedback signal pin contact surfaces 46 are used for transferring sampling signals.

The at least one input positive terminal 62 of the pin layer 6 is electrically connected with the corresponding input positive terminal contact surface 42. The at least one output positive terminal 63 is electrically connected with the corresponding output positive terminal contact surface 43. The at least one output negative terminal 64 is electrically connected with the corresponding output negative terminal contact surface 44. The at least one control signal pin 65 is electrically connected with the corresponding control signal pin contact surface 45. The at least one feedback signal pin 66 is electrically connected with the corresponding feedback signal pin contact surface 46. The at least one input positive terminal contact pad 532 of the power device 5 is electrically connected with the corresponding input positive terminal contact surface 42. The at least one power component contact pad 531 is electrically connected with the corresponding power component terminal contact surface 41. The at least one output negative terminal contact pad 534 is electrically connected with the corresponding output negative terminal contact surface 44. The at least one control signal contact pad 535 is electrically connected with the corresponding control signal pin contact surface 45. The at least one feedback signal contact pad 536 is electrically connected with the corresponding feedback signal pin contact surface 46.

In another embodiment, the output positive terminal contact surfaces 43, the input positive terminal contact surfaces 42, the output negative terminal contact surfaces 44, the control signal pin contact surfaces 45 and the feedback signal pin contact surfaces 46 are used as external pins of the power conversion module 1 and directly connected with the system board. Under this circumstance, the power conversion module 1 omits the pin layer, and thus the thickness of the power conversion module 1 is reduced.

In one embodiment, the material of the magnetic core assembly 20 is specially determined. Preferably, the material of the middle leg 27 is different from the material of the rest of the magnetic core assembly 20. For example, the middle leg 27 is made of iron powder with distributed air gap, and the rest of the magnetic core assembly 20 is made of ferrite. Consequently, the core loss of the magnetic core assembly 20 is decreased, and the core loss of the middle leg 27 is not obviously increased. In an embodiment, the cross section area of the middle leg 27 and the cross section area of the lateral leg 28 are equal.

Please refer to FIGS. 2A, 2B and 3A again. In this embodiment, the magnetic core assembly 20 includes two E-shaped cores 200. Each E-shaped core 200 includes a middle post and two lateral posts. The middle post is a partial structure of the middle leg 27. The two lateral posts are partial structures of the corresponding lateral legs 28. The two E-shaped cores 200 are opposed to each other. The outer surface of one E-shaped core 200 is the top surface 21 of the magnetic core assembly 20. The outer surface of the other E-shaped core 200 is the bottom surface 22 of the magnetic core assembly 20.

Figure 6:
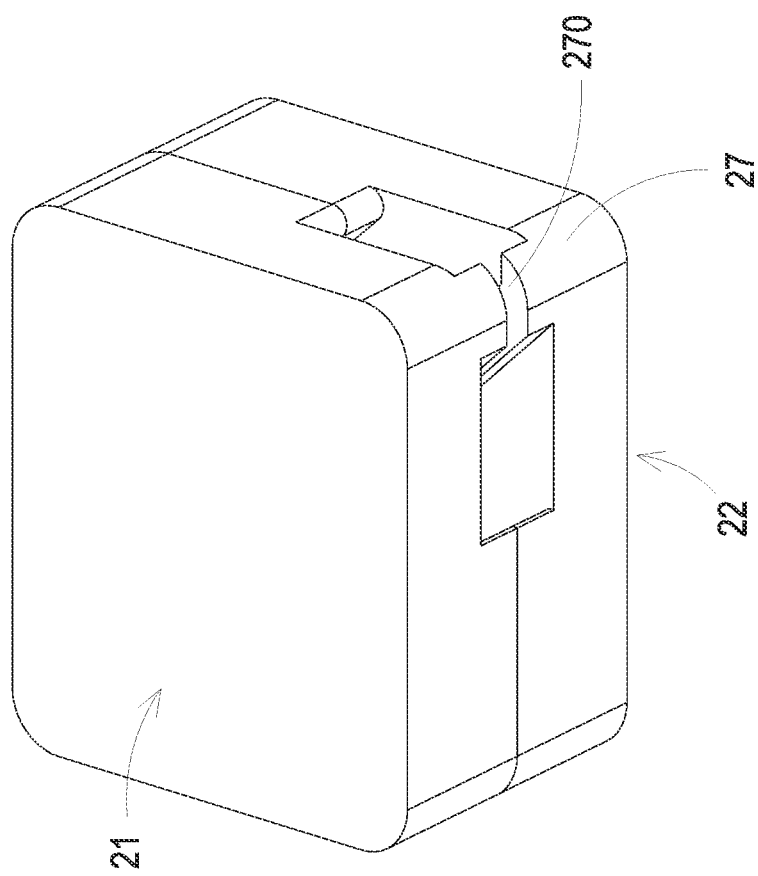
FIG. 6 is a schematic assembled view illustrating a second exemplary structure of a magnetic core assembly of the power conversion module according to the first embodiment of the present disclosure.

FIG. 6 is a schematic assembled view illustrating a second exemplary structure of a magnetic core assembly of the power conversion module according to the first embodiment of the present disclosure. In this embodiment, the middle leg 27 of the magnetic core assembly 20 includes an air gap 270. For example, the air gap 270 is located at an upper portion of the middle leg 27 and located near the top surface 21 of the magnetic core assembly 20. Alternatively, the air gap 270 is located at a lower portion of the middle leg 27 and located near the bottom surface 22 of the magnetic core assembly 20. Alternatively, the air gap 270 is located at a middle region of the middle leg 27. Due to this structural design, the magnetic resistance of the middle leg 27 is increased, and the magnetic densities of the middle leg 27 and the lateral legs 28 are increased. Consequently, the performance of the magnetic device 2 to withstand the current saturation is enhanced.

Figure 7:
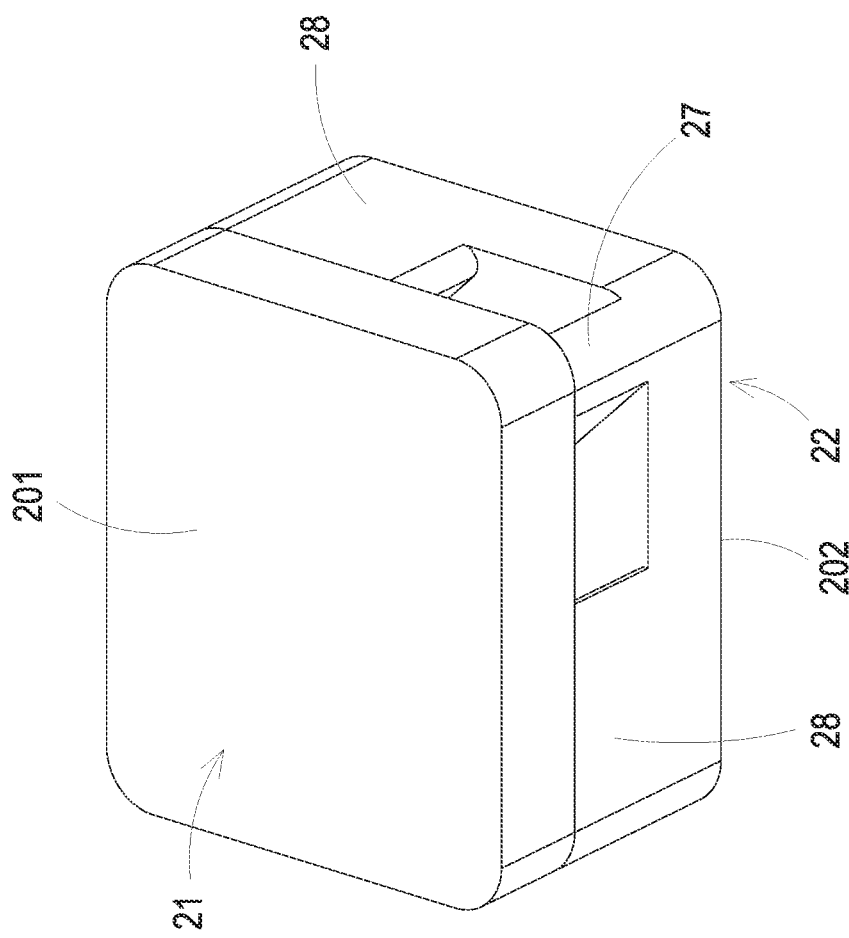
FIG. 7 is a schematic assembled view illustrating a third exemplary structure of a magnetic core assembly of the power conversion module according to the first embodiment of the present disclosure.

FIG. 7 is a schematic assembled view illustrating a third exemplary structure of a magnetic core assembly of the power conversion module according to the first embodiment of the present disclosure. In this embodiment, the magnetic core assembly 20 includes an I-shaped core 201 and an E-shaped core 202. The E-shaped core 202 includes a middle post and two lateral posts. The middle post is the middle leg 27. The two lateral posts are the corresponding lateral legs 28. The I-shaped core 201 and the E-shaped core 202 are opposed to each other. The outer surface of one of the I-shaped core 201 and the E-shaped core 202 is the top surface 21 of the magnetic core assembly 20. The outer surface of the other of the I-shaped core 201 and the E-shaped core 202 is the bottom surface 22 of the magnetic core assembly 20.

Figure 8A:
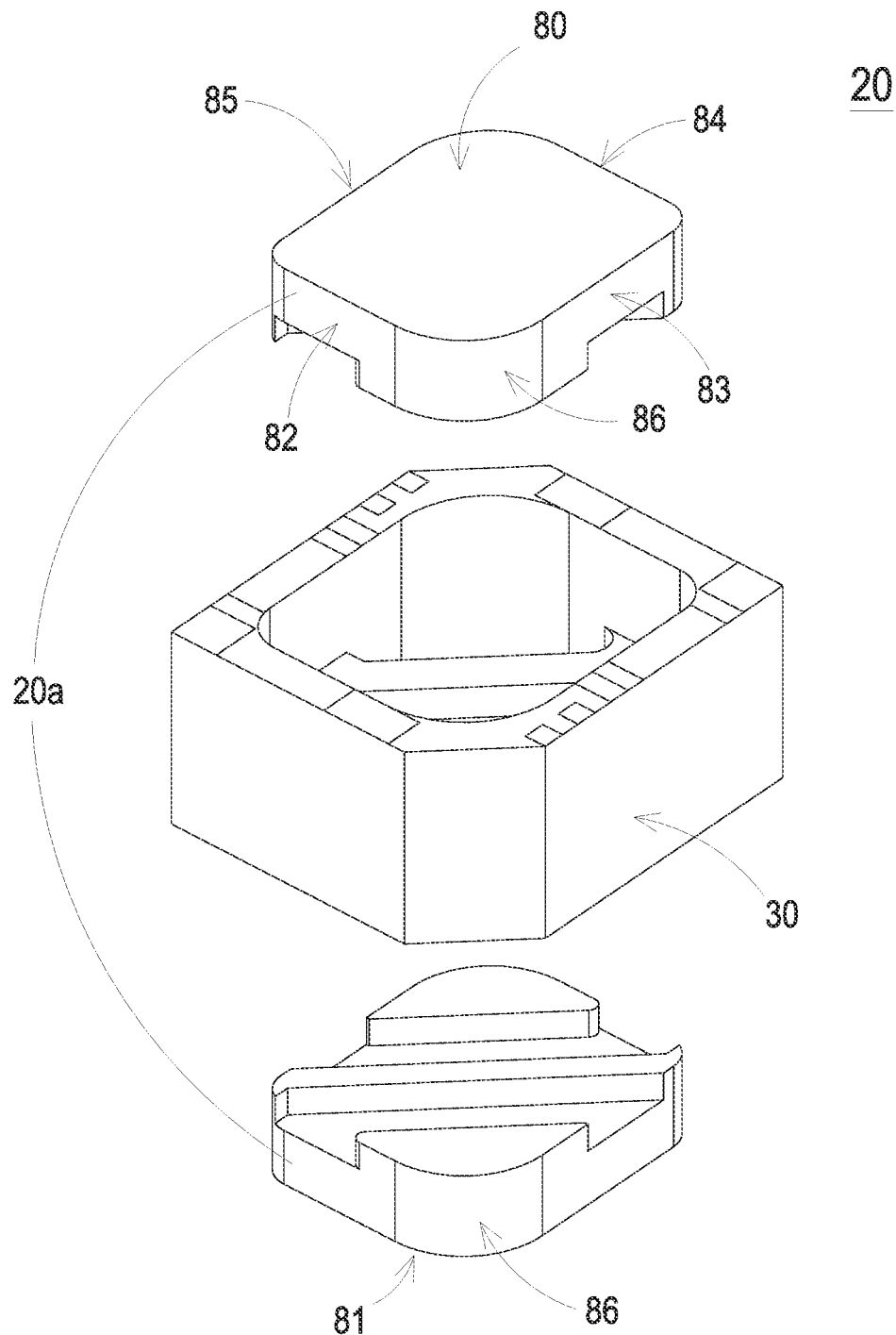
FIG. 8A is a schematic exploded view illustrating a variant example of the magnetic core assembly of FIG. 2A.
Figure 8B:
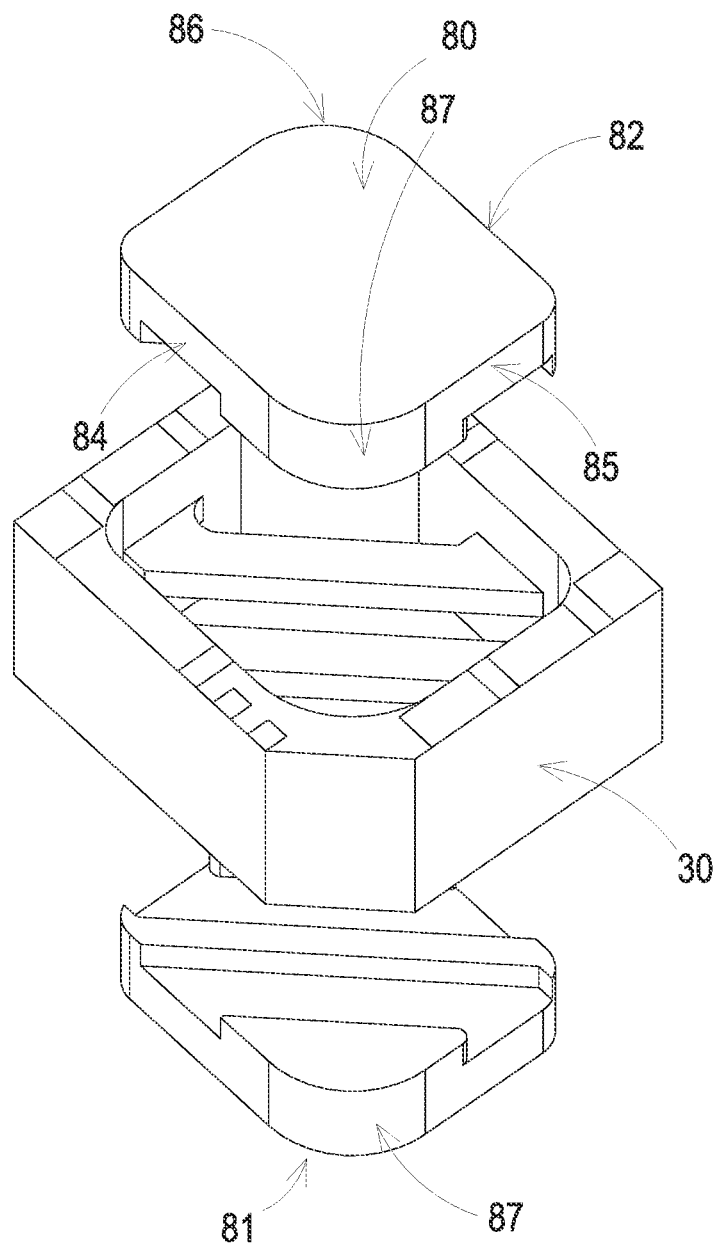
FIG. 8B is a schematic exploded view illustrating the magnetic core assembly as shown in FIG. 8A and taken along another viewpoint.

FIG. 8A is a schematic exploded view illustrating a variant example of the magnetic core assembly of FIG. 2A. FIG. 8B is a schematic exploded view illustrating the magnetic core assembly as shown in FIG. 8A and taken along another viewpoint. It is noted that the configuration of the magnetic core assembly is not restricted to the hexahedral structure. In the embodiment of FIGS. 8A and 8B, the magnetic core assembly 20a has an octahedral structure. The magnetic core assembly 20a has a top surface 80, a bottom surface 81, a first lateral side 82, a second lateral side 83, a third lateral side 84, a fourth lateral side 85, a fifth lateral side 86 and a sixth lateral side 87. The fifth lateral side 86 and the sixth lateral side 87 are disposed between the top surface 80 and the bottom surface 81. The fifth lateral side 86 is disposed between the first lateral side 82 and the second lateral side 83. The sixth lateral side 87 is disposed between the third lateral side 84 and the fourth lateral side 85.

The present disclosure further provides other possible embodiments of the power conversion modules. Component parts and elements corresponding to those of the first embodiment are designated by identical numeral references, and detailed descriptions thereof are omitted.

Figure 9A:
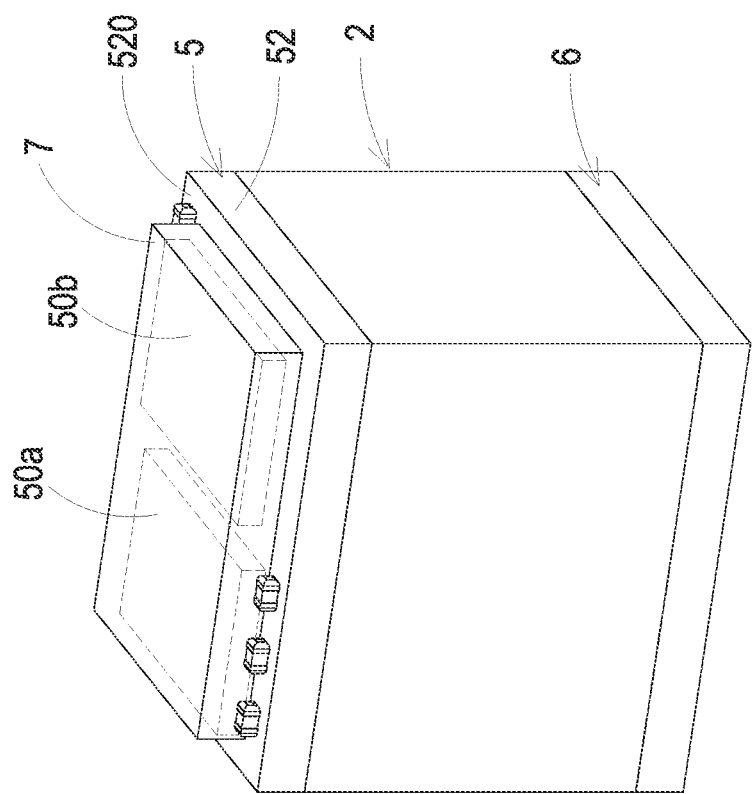
FIG. 9A is a schematic assembled view illustrating a power conversion module according to a second embodiment of the present disclosure.
Figure 9B:
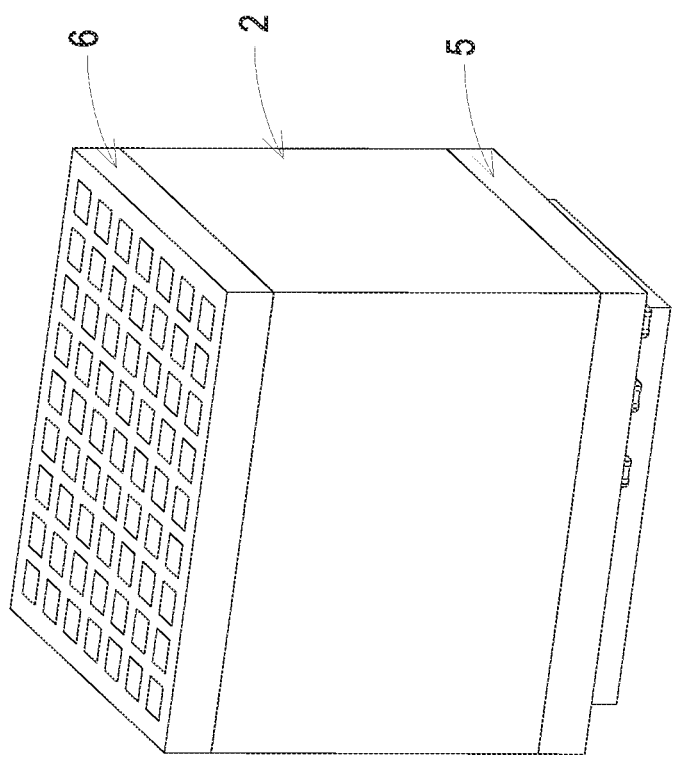
FIG. 9B is a schematic assembled view illustrating the power conversion module as shown in FIG. 9A and taken along another viewpoint.
Figure 10A:
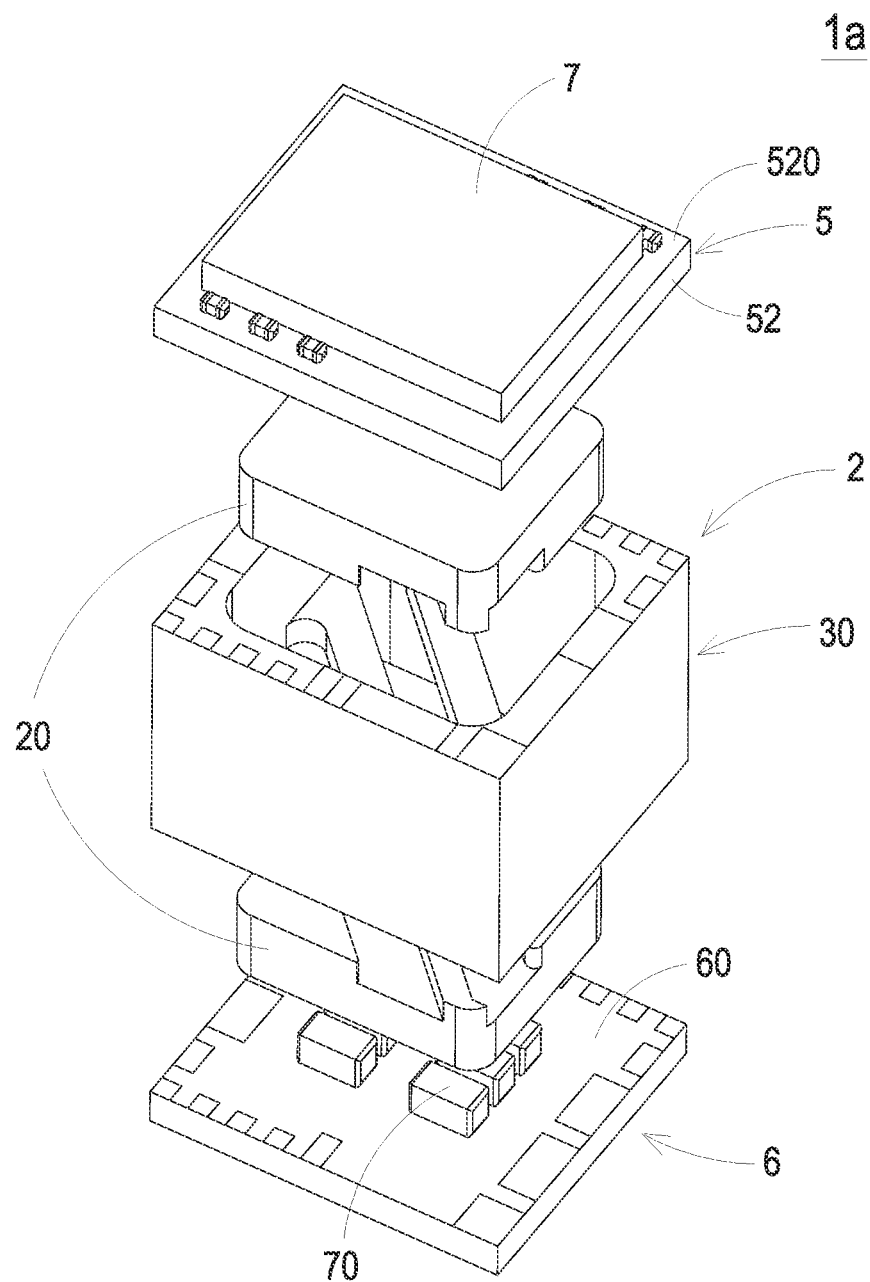
FIG. 10A is a schematic exploded view illustrating the power conversion module as shown in FIG. 9A.
Figure 10B:
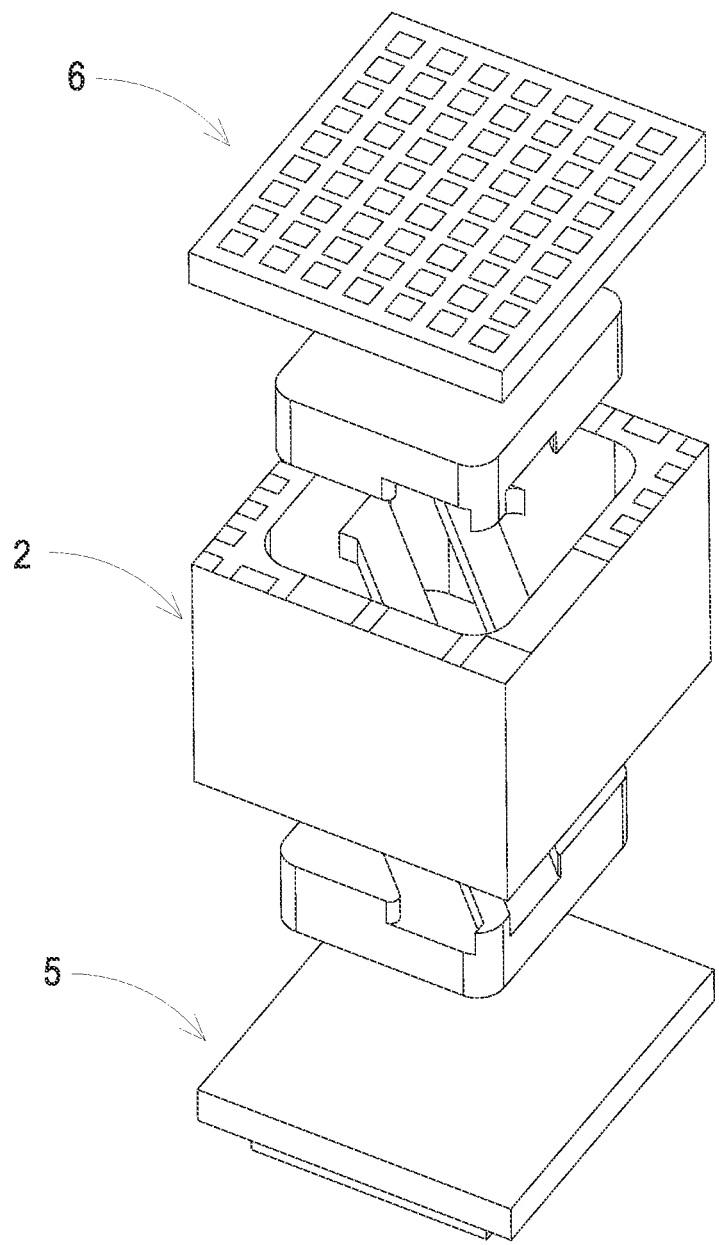
FIG. 10B is a schematic exploded view illustrating the power conversion module as shown in FIG. 10A and taken along another viewpoint.

FIG. 9A is a schematic assembled view illustrating a power conversion module according to a second embodiment of the present disclosure. FIG. 9B is a schematic assembled view illustrating the power conversion module as shown in FIG. 9A and taken along another viewpoint. FIG. 10A is a schematic exploded view illustrating the power conversion module as shown in FIG. 9A. FIG. 10B is a schematic exploded view illustrating the power conversion module as shown in FIG. 10A and taken along another viewpoint. In comparison with the power conversion module 1 of the first embodiment, the two power components 50a and 50b (i.e., the two half-bridge arms) of the power conversion module 1a in this embodiment are included in a package unit 7. The package unit 7 is welded on the first surface 520 of the circuit board 52 of the power device 5. Moreover, the power conversion module 1a further includes at least one output capacitor 70 (i.e., the output capacitor Co as shown in FIG. 4). The output capacitor 70 is disposed on the first surface 60 of the pin layer 6. That is, the output capacitor 70 is disposed between the magnetic core assembly 20 and the pin layer 6. Consequently, the ripple of the output voltage is reduced. Moreover, the projection region of the output capacitor Co with respect to the horizontal plane and the projection region of the magnetic core assembly 20 with respect to the horizontal plane are partially overlapped with each other.

Figure 11B:
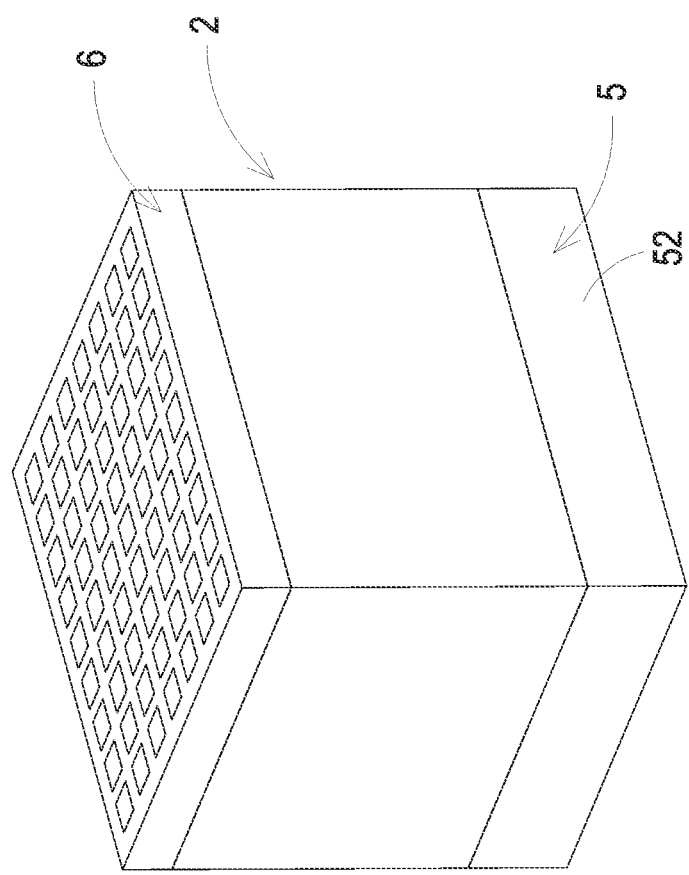
FIG. 11B is a schematic assembled view illustrating the power conversion module as shown in FIG. 11A and taken along another viewpoint.
Figure 12A:
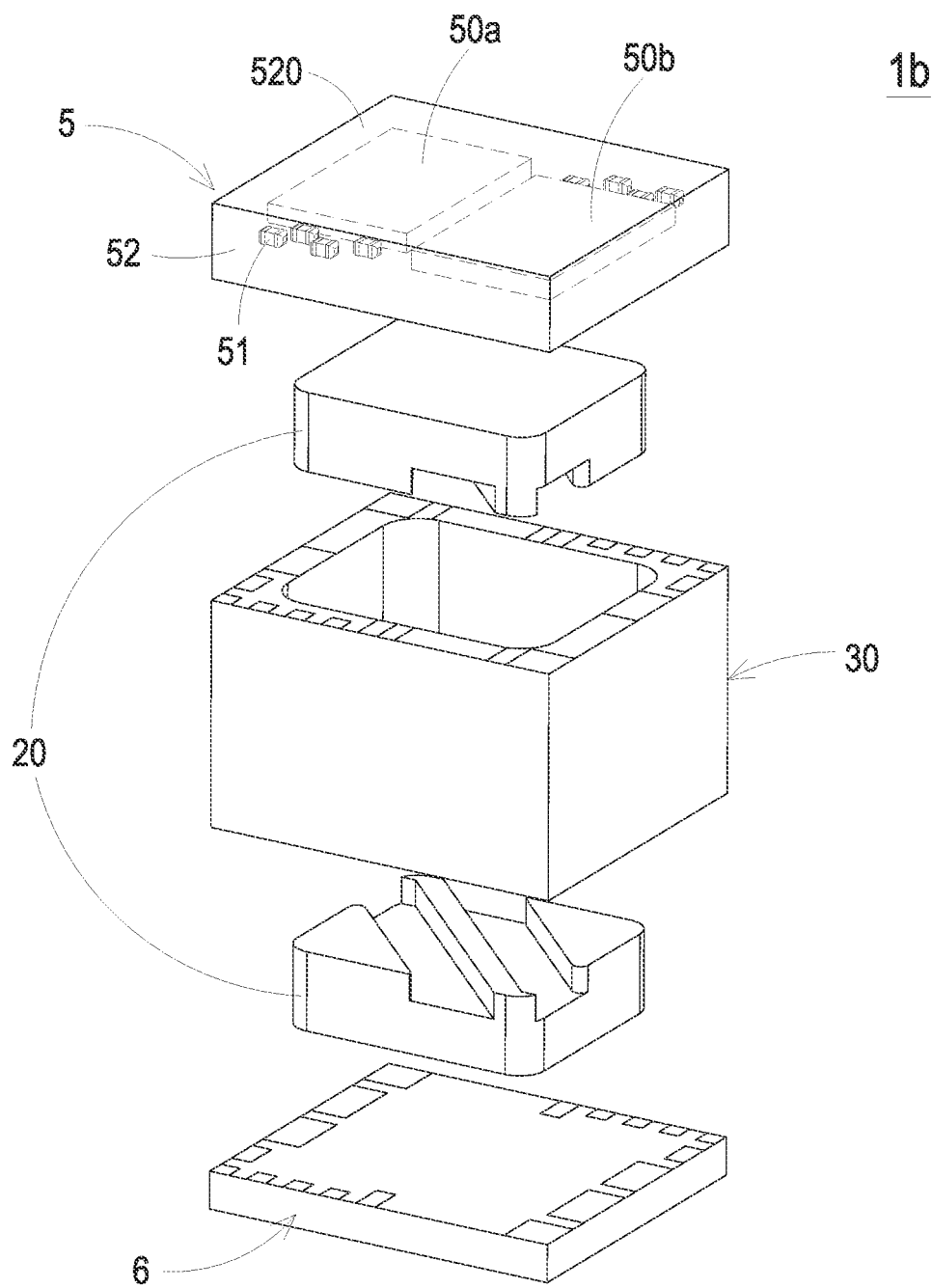
FIG. 12A is a schematic exploded view illustrating the power conversion module as shown in FIG. 11A.
Figure 12B:
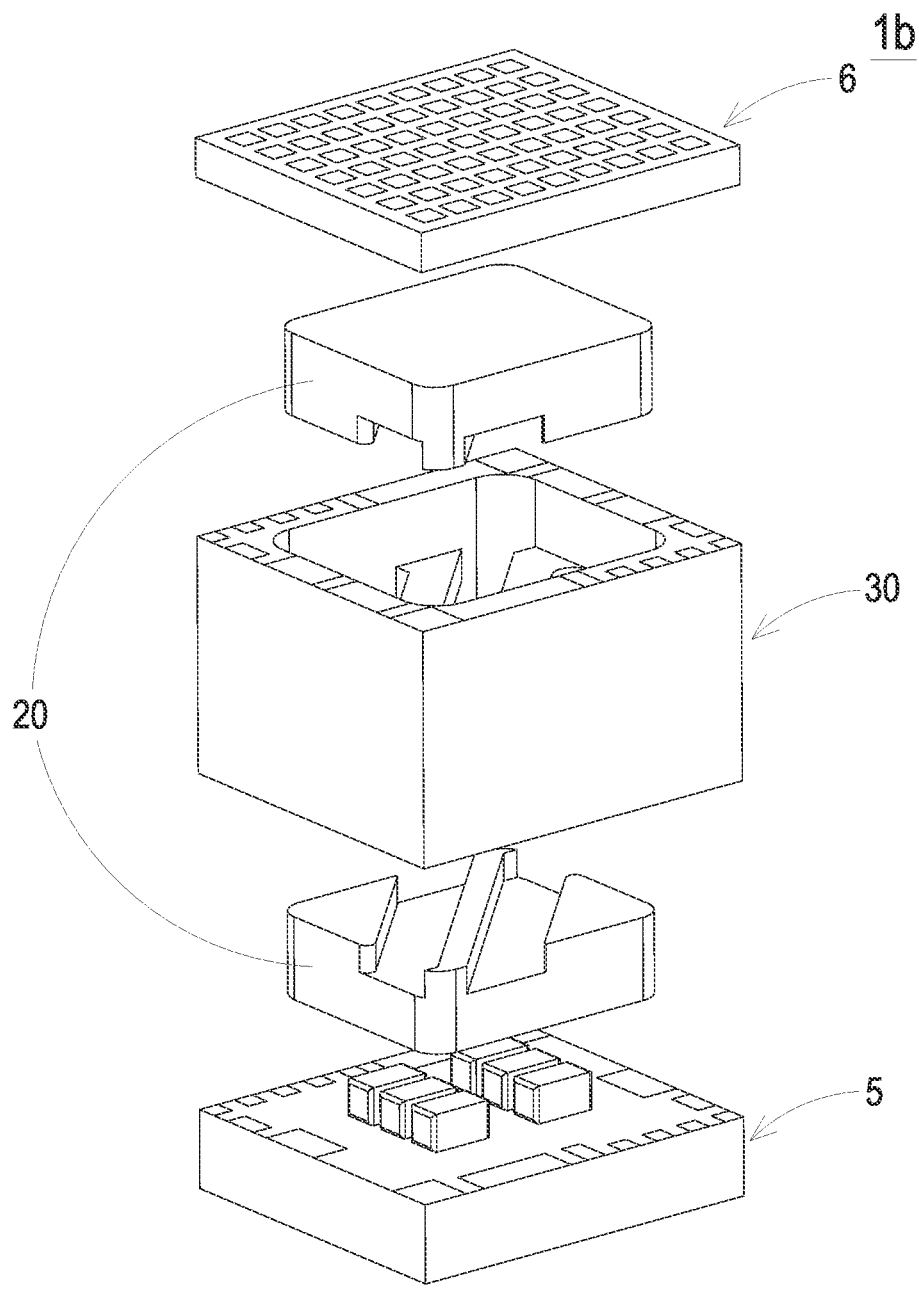
FIG. 12B is a schematic exploded view illustrating the power conversion module as shown in FIG. 12A and taken along another viewpoint.

FIG. 11A is a schematic perspective view illustrating a power conversion module according to a third embodiment of the present disclosure. FIG. 11B is a schematic assembled view illustrating the power conversion module as shown in FIG. 11A and taken along another viewpoint. FIG. 12A is a schematic exploded view illustrating the power conversion module as shown in FIG. 11A. FIG. 12B is a schematic exploded view illustrating the power conversion module as shown in FIG. 12A and taken along another viewpoint. In comparison with the power conversion module 1 of the first embodiment, the two power components 50a and 50b (i.e., the two half-bridge arms) and the controller 51 of the power conversion module 1b in this embodiment are embedded in the circuit board 52. Consequently, the difficulty of performing the printed circuit board assembly (PCBA) is reduced. Since no other electronic components are disposed on the first surface 520 of the circuit board 52, a heat sink (not shown) can be disposed on the first surface 520 of the circuit board 52 more easily.

Figure 13A:
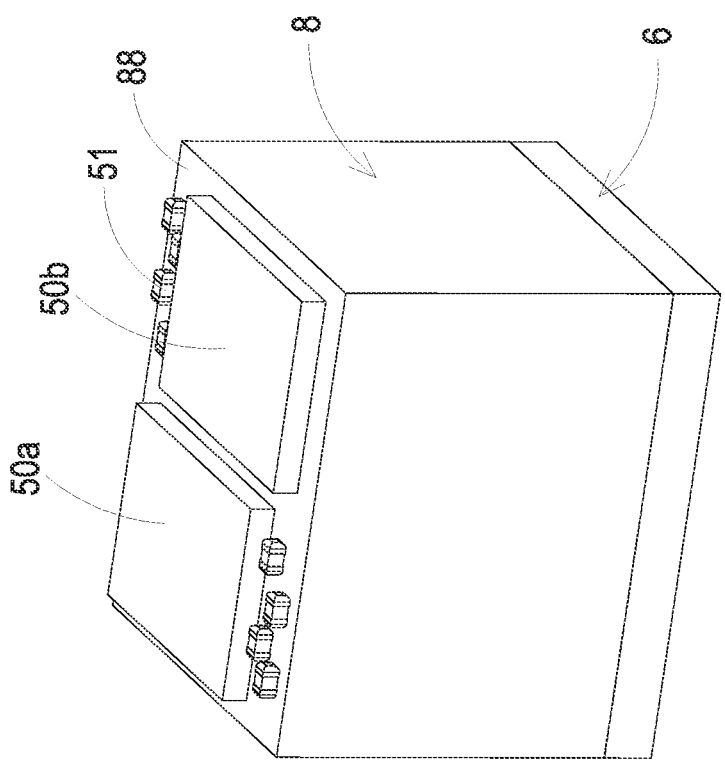
FIG. 13A is a schematic assembled view illustrating a power conversion module according to a fourth embodiment of the present disclosure.
Figure 13B:
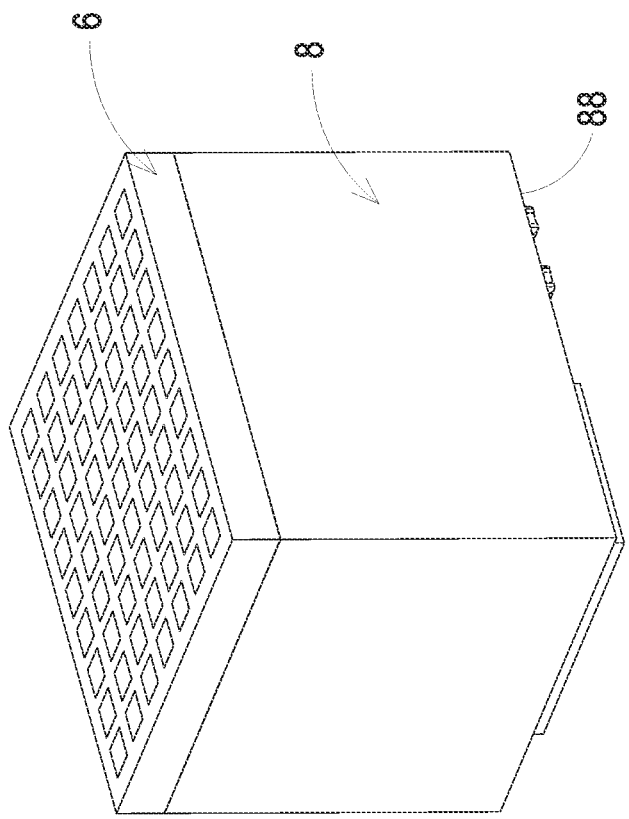
FIG. 13B is a schematic assembled view illustrating the power conversion module as shown in FIG. 13A and taken along another viewpoint.
Figure 14B:
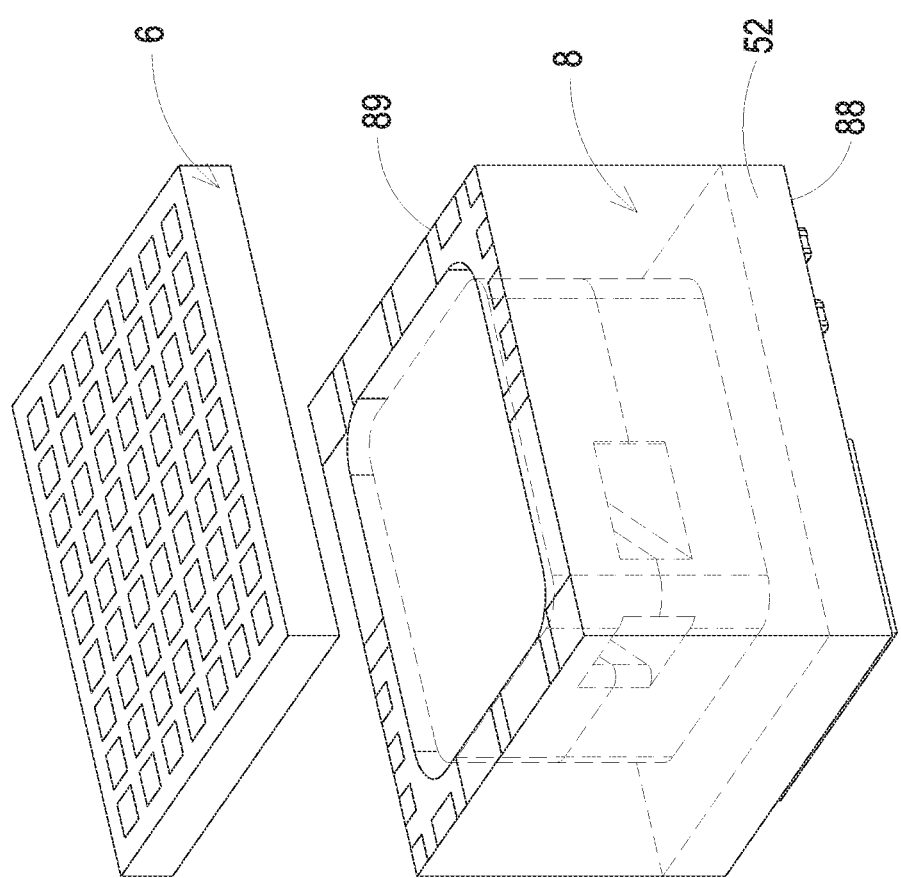
FIG. 14B is a schematic exploded view illustrating the power conversion module as shown in FIG. 14A and taken along another viewpoint.

FIG. 13A is a schematic assembled view illustrating a power conversion module according to a fourth embodiment of the present disclosure. FIG. 13B is a schematic assembled view illustrating the power conversion module as shown in FIG. 13A and taken along another viewpoint. FIG. 14A is a schematic exploded view illustrating the power conversion module as shown in FIG. 13A. FIG. 14B is a schematic exploded view illustrating the power conversion module as shown in FIG. 14A and taken along another viewpoint. In comparison with the power conversion module 1 of the first embodiment, the magnetic device 2 and the circuit board 52 in the power conversion module 1c of this embodiment are included in a package structure 8. Consequently, the height of the power conversion module 1c is reduced. The package structure 8 has a first surface 88 and a second surface 89, which are opposed to each other. The first surface 88 of the package structure 8 is located near the first surface (not shown) of the circuit board 52. In addition, the two power components 50a and 50b (i.e., the two half-bridge arms) and the controller 51 are welded on the first surface 88 of the package structure 8. The second surface 89 of the package structure 8 is attached to the pin layer 6. In addition, the input positive terminal contact surfaces, the output negative terminal contact surfaces, the control signal pin contact surfaces and the feedback signal pin contact surfaces are formed on the second surface 89 of the package structure 8.

Figure 15A:
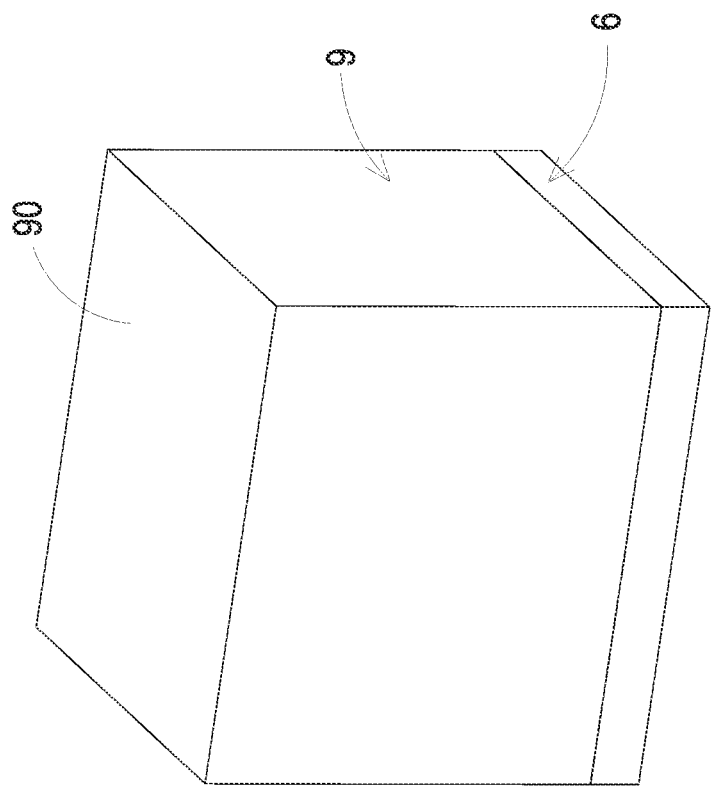
FIG. 15A is a schematic assembled view illustrating a power conversion module according to a fifth embodiment of the present disclosure.
Figure 15B:
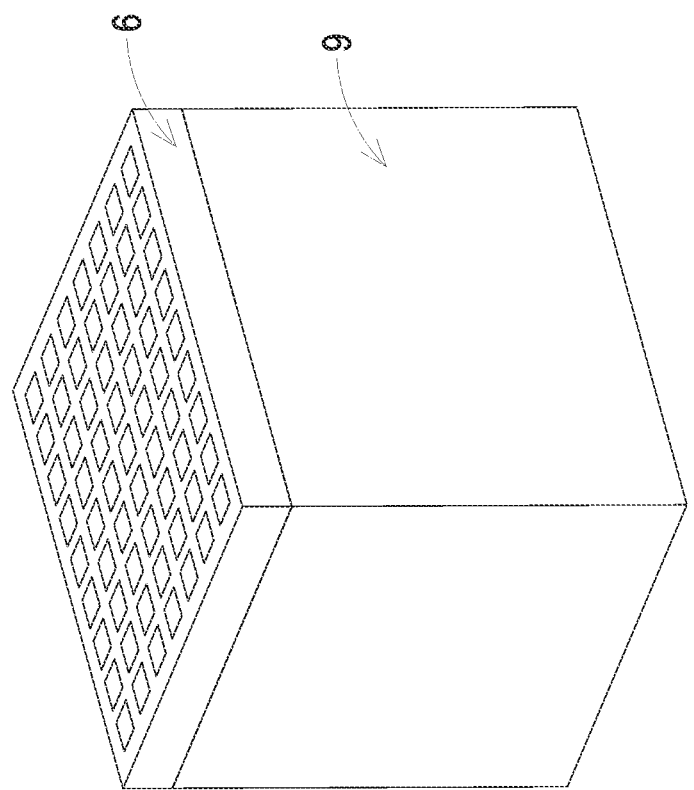
FIG. 15B is a schematic assembled view illustrating the power conversion module as shown in FIG. 15A and taken along another viewpoint.
Figure 16B:
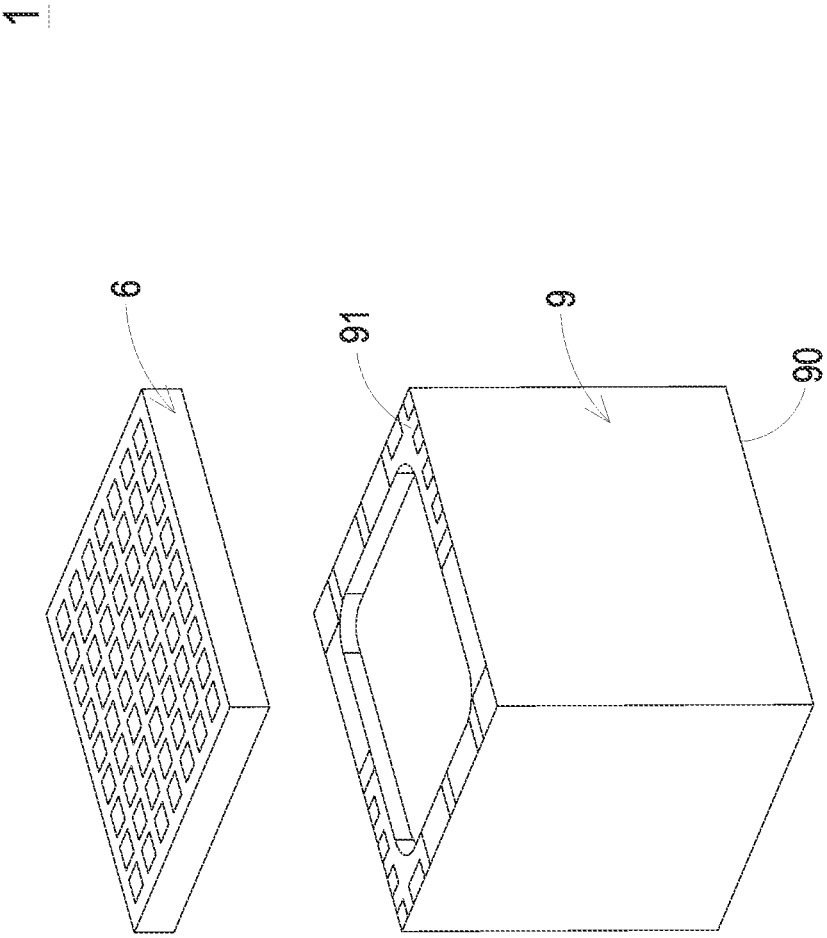
FIG. 16B is a schematic exploded view illustrating the power conversion module as shown in FIG. 16A and taken along another viewpoint.

FIG. 15A is a schematic assembled view illustrating a power conversion module according to a fifth embodiment of the present disclosure. FIG. 15B is a schematic assembled view illustrating the power conversion module as shown in FIG. 15A and taken along another viewpoint. FIG. 16A is a schematic exploded view illustrating the power conversion module as shown in FIG. 15A. FIG. 16B is a schematic exploded view illustrating the power conversion module as shown in FIG. 16A and taken along another viewpoint. In comparison with the power conversion module 1c of FIG. 13A, the magnetic device 2, the circuit board 52, two power components 50a and 50b (i.e., the two half-bridge arms) and the controller 51 in the power conversion module 1d of this embodiment are included in a package structure 9. Consequently, the height of the power conversion module 1d is further reduced. The package structure 9 has a first surface 90 and a second surface 91, which are opposed to each other. The first surface 90 of the package structure 9 is located near the first surface (not shown) of the circuit board 52. Since no other electronic components are disposed on the first surface 90 of the package structure 9, a heat sink (not shown) can be disposed on the first surface 90 of the package structure 9 more easily. The second surface 91 of the package structure 9 is attached to the pin layer 6. In addition, the input positive terminal contact surfaces, the output negative terminal contact surfaces, the control signal pin contact surfaces and the feedback signal pin contact surfaces are formed on the second surface 91 of the package structure 9.

Figure 17A:
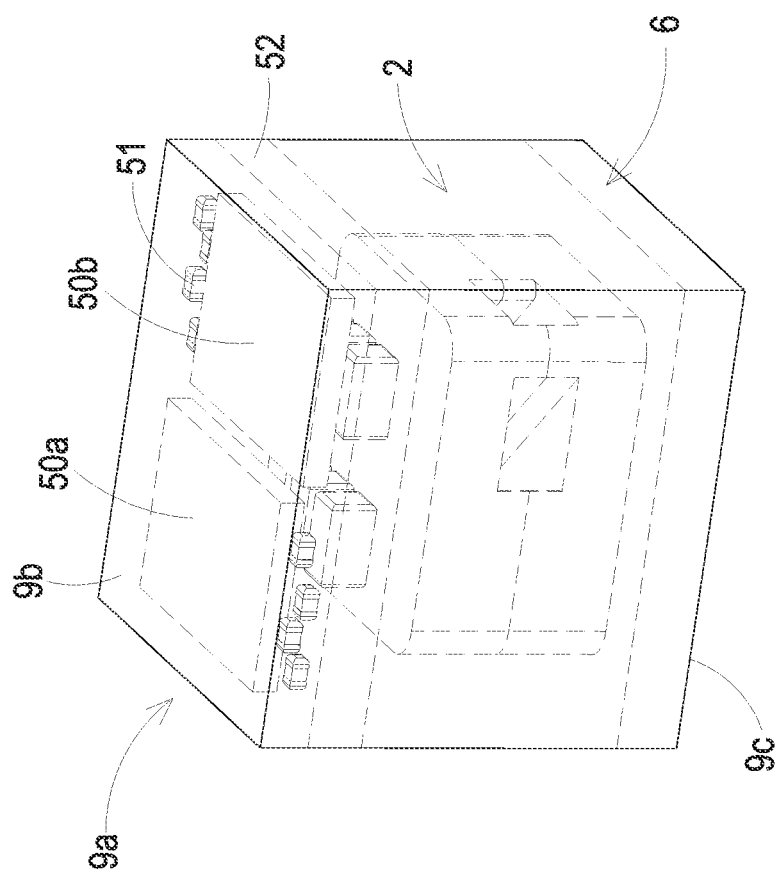
FIG. 17A is a schematic perspective view illustrating a power conversion module according to a sixth embodiment of the present disclosure.
Figure 17B:
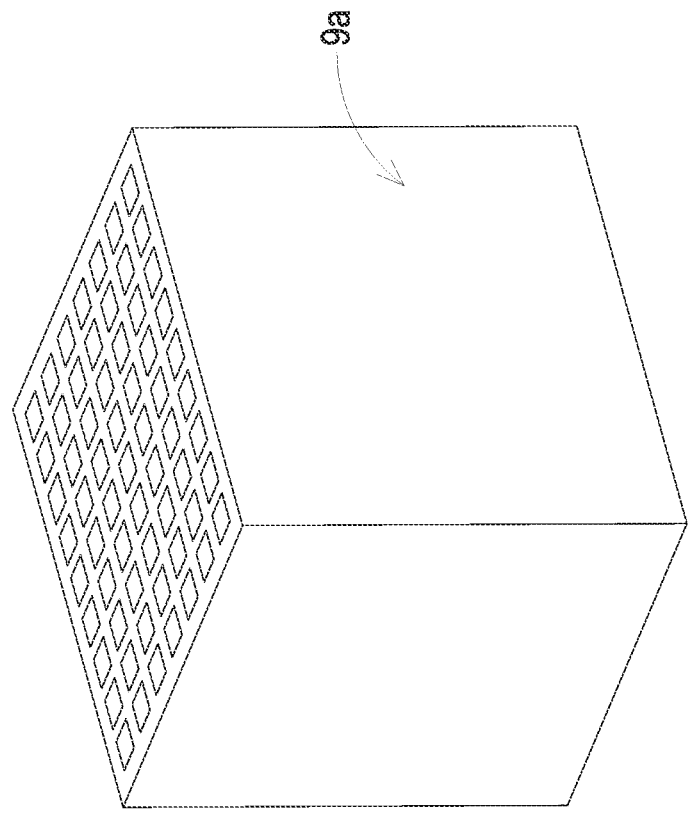
FIG. 17B is a schematic assembled view illustrating the power conversion module as shown in FIG. 17A and taken along another viewpoint.

FIG. 17A is a schematic perspective view illustrating a power conversion module according to a sixth embodiment of the present disclosure. FIG. 17B is a schematic assembled view illustrating the power conversion module as shown in FIG. 17A and taken along another viewpoint. In comparison with the power conversion module 1d of FIG. 15A, the magnetic device 2, the circuit board 52 and the pin layer 6 in the power conversion module 1e of this embodiment are included in a package structure 9a. Consequently, the height of the power conversion module 1e is further reduced. The package structure 9a has a first surface 9b and a second surface 9c, which are opposed to each other. The first surface 9b of the package structure 9a is located near the first surface (not shown) of the circuit board 52. Since no other electronic components are disposed on the first surface 9b of the package structure 9a, a heat sink (not shown) can be disposed on the first surface 9b of the package structure 9a more easily.

In an embodiment, the two power components 50a and 50b (i.e., the two half-bridge arms) and the controller 51 disposed on the circuit board 52 are also included in the package structure 9a. Moreover, the top surface of each of the two power components 50a and 50b (i.e., the two half-bridge arms) is lower than the first surface 9b of the package structure 9a. In other embodiment, the two power components 50a and 50b (i.e., the two half-bridge arms) and the controller 51 are disposed on the first surface 9b of the package structure 9a.

From the above descriptions, the present disclosure provides the power conversion module and the magnetic device. In one embodiment, the magnetic core assembly of the magnetic device is specially designed. That is, the two opposite ends of the first winding groove are respectively exposed to the first lateral side and the fourth lateral side. The two opposite ends of the second winding groove are respectively exposed to the second lateral side and the third lateral side. In other words, the two opposite ends of the first winding groove and the two opposite ends of the second winding groove are exposed to four different lateral sides of the magnetic core assembly, respectively. After the two windings are disposed within the two winding grooves to be formed as the coupled inductors, the coupled inductors can be distributed more uniformly. Consequently, the distances between the output terminals of the two coupled inductors and the output positive terminal of the power conversion module are nearly equal. Consequently, the asymmetry of the equivalent series resistances of the two coupled inductors is reduced, and the currents flowing through the two coupled inductors are nearly equal. Since the DC magnetic fluxes flowing through the lateral legs of the magnetic core assembly are reduced, the lateral legs of the magnetic core assembly are not readily subjected to magnetic saturation. Consequently, the performance of the power conversion module is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic device, comprising:
  a magnetic core assembly comprising a top surface, a bottom surface, a first lateral side, a second lateral side, a third lateral side, a fourth lateral side, a middle leg and two lateral legs, wherein the first lateral side, the second lateral side, the third lateral side and the fourth lateral side are disposed between the top surface and the bottom surface, the first lateral side and the third lateral side are opposed to each other, the second lateral side and the fourth lateral side are opposed to each other, the middle leg is disposed between the two lateral legs, a first winding groove is defined by the middle leg and one of the two lateral legs collaboratively, and a second winding groove is defined by the middle leg and the other of the two lateral legs collaboratively, wherein two opposite ends of the first winding groove are respectively exposed to the first lateral side and the fourth lateral side so that the first winding groove directly contacts the first lateral side and the fourth lateral side, and two opposite ends of the second winding groove are respectively exposed to the second lateral side and the third lateral side so that the second winding groove directly contacts the second lateral side and the third lateral side;
a first winding, wherein at least a part of the first winding is disposed within the first winding groove; and
a second winding, wherein at least a part of the second winding is disposed within the second winding groove.

2. The magnetic device according to claim 1, further comprising:
a main frame having a first surface and a second surface, which are opposed to each other, wherein the magnetic core assembly is disposed within the main frame, the top surface of the magnetic core assembly is located beside the first surface of the main frame, and the bottom surface of the magnetic core assembly is located beside the second surface of the main frame; and
a conductive structure embedded between the first surface and the second surface of the main frame, wherein the conductive structure is partially exposed to the first lateral side, the second lateral side, the third lateral side or the fourth lateral side of the magnetic core assembly, and a portion of the conductive structure is formed as the first winding and the second winding.

3. The magnetic device according to claim 1, wherein the first winding groove and the second winding groove are in parallel with each other.

4. The magnetic device according to claim 1, wherein the first lateral side and the second lateral side are connected with each other, and the third lateral side and the fourth lateral side are connected with each other, wherein an angle between the first lateral side and the second lateral side or an angle between the first lateral side and the fourth lateral side is smaller than or equal to 120 degrees.

5. The magnetic device according to claim 4, wherein a line passing through the two opposite ends of the first winding groove are not perpendicular to the first lateral side and the fourth lateral side, and a line passing through the two opposite ends of the second winding groove are not perpendicular to the second lateral side and the third lateral side.

6. The magnetic device according to claim 2, wherein the conductive structure includes at least one copper layer or at least one copper block, which is previously embedded in the main frame.

7. The magnetic device according to claim 2, wherein the conductive structure comprises two first connection parts and two second connection parts, wherein the two first connection parts and the two second connection parts are embedded in at least two sidewalls of the main frame, and the first winding and the second winding are connected between the corresponding first connection parts and the corresponding second connection parts, respectively, wherein an end surface of each first connection part is partially exposed to the first surface of the main frame and formed as a power component terminal contact surface, and an end surface of the second connection parts is partially exposed to the second surface of the main frame and formed as an output positive terminal contact surface.

8. The magnetic device according to claim 7, wherein the first surface of the main frame is higher than the top surface of the magnetic core assembly, and the second surface of the main frame is lower than the bottom surface of the magnetic core assembly.

9. The magnetic device according to claim 1, wherein a material of the middle leg is different from a material of the rest of the magnetic core assembly.

10. The magnetic device according to claim 9, wherein the middle leg is made of iron powder with distributed air gap, and the rest of the magnetic core assembly is made of ferrite.

11. The magnetic device according to claim 1, wherein the middle leg of the magnetic core assembly has an air gap.

12. The magnetic device according to claim 11, wherein the air gap is located at an upper portion of the middle leg and located near the top surface of the magnetic core assembly, the air gap is located at a lower portion of the middle leg and located near the bottom surface of the magnetic core assembly, or the air gap is located at a middle region of the middle leg.

13. The magnetic device according to claim 1, wherein the magnetic core assembly comprises:
an I-shaped core; and
an E-shaped core comprising a middle post and two lateral posts, wherein the middle post is the middle leg, and the two lateral posts are the corresponding lateral legs,
wherein the I-shaped core and the E-shaped core are opposed to each other, an outer surface of one of the I-shaped core and the E-shaped core is the top surface of the magnetic core assembly, and an outer surface of the other of the I-shaped core and the E-shaped core is the bottom surface of the magnetic core assembly.

14. The magnetic device according to claim 1, wherein the magnetic core assembly comprises two E-shaped cores, and each E-shaped core comprises a middle post and two lateral posts, wherein the middle post is a partial structure of the middle leg, and the two lateral posts are partial structures of the corresponding lateral legs, wherein the two E-shaped cores are opposed to each other, an outer surface of one of the two E-shaped cores is the top surface of the magnetic core assembly, and an outer surface of the other of the two E-shaped cores is the bottom surface of the magnetic core assembly.

15. The magnetic device according to claim 1, wherein the magnetic core assembly further comprises a fifth lateral side and a sixth lateral side, wherein the fifth lateral side and the sixth lateral side are disposed between the top surface and the bottom surface, the fifth lateral side is disposed between the first lateral side and the second lateral side, and the sixth lateral side is disposed between the third lateral side and the fourth lateral side.

16. A power conversion module, comprising:
a magnetic device comprising:
a main frame having a first surface and a second surface opposed to the first surface;
a magnetic core assembly comprising a top surface, a bottom surface, a first lateral side, a second lateral side, a third lateral side, a fourth lateral side, a middle leg and two lateral legs, wherein the first lateral side, the second lateral side, the third lateral side and the fourth lateral side are disposed between the top surface and the bottom surface, the first lateral side and the third lateral side are opposed to each other, the second lateral side and the fourth lateral side are opposed to each other, the middle leg is disposed between the two lateral legs, a first winding groove is defined by the middle leg and one of the two lateral legs collaboratively, a second winding groove is defined by the middle leg and the other of the two lateral legs collaboratively, two opposite ends of the first winding groove are respectively exposed to the first lateral side and the fourth lateral side, and two opposite ends of the second winding groove are respectively exposed to the second lateral side and the third lateral side; and a conductive structure embedded between the first surface and the second surface of the main frame and partially exposed to the first lateral side, the second lateral side, the third lateral side or the fourth lateral side of the magnetic core assembly, wherein a portion of the conductive structure is formed as a first winding and a second winding, wherein at least a part of the first winding is disposed within the first winding groove, and at least a part of the second winding is disposed within the second winding groove; and a power device disposed on the first surface of the main frame, wherein the power device comprises at least one power component, and the at least one power component is electrically connected with the conductive structure, wherein a direction of a current flowing the first winding and a direction of a current flowing through the second winding are opposite.

17. The power conversion module according to claim 16, wherein the power device further comprises a circuit board, and the at least one power component is disposed on the circuit board, wherein the circuit board has a first surface and a second surface opposed to the first surface, and the second surface of the circuit board is located beside the first surface of the main frame.

18. The power conversion module according to claim 17, wherein the at least one power component comprises two power components, wherein one power component comprises a first half-bridge arm with two switches, and the other power component comprises a second half-bridge arm with two switches.

19. The power conversion module according to claim 18, wherein the two power components are symmetrically disposed on the first surface of the circuit board along a diagonal line.

20. The power conversion module according to claim 18, wherein the two power components are included in a package unit, and the package unit is disposed on the first surface of the circuit board.

21. The power conversion module according to claim 18, wherein the two power components are embedded in the circuit board.

22. The power conversion module according to claim 18, wherein the magnetic device and the circuit board are included in a package structure, and the package structure has a first surface and a second surface opposed to the first surface, wherein the first surface of the package structure is located near the first surface of the circuit board, and the two power components are disposed on the first surface of the package structure.

23. The power conversion module according to claim 18, wherein the magnetic device, the circuit board and the two power components are included in a package structure, and the package structure has a first surface and a second surface opposed to the first surface, wherein the first surface of the package structure is located near the first surface of the circuit board.

24. The power conversion module according to claim 18, wherein the conductive structure comprises two first connection parts and two second connection parts, wherein the two first connection parts and the two second connection parts are embedded in at least two sidewalls of the main frame, and the first winding and the second winding are connected between the corresponding first connection parts and the corresponding second connection parts, respectively, wherein an end surface of each first connection part is partially exposed to the first surface of the main frame and formed as a power component terminal contact surface, and an end surface of the second connection parts is partially exposed to the second surface of the main frame and formed as an output positive terminal contact surface.

25. The power conversion module according to claim 24, wherein a first terminal of the first winding is electrically connected with the first half-bridge arm, and a first terminal of the second winding is electrically connected with the second half-bridge arm, wherein a projection region of the first half-bridge arm with respect to the circuit board and a projection region of the second half-bridge arm with respect to the circuit board are partially overlapped with each other.

26. The power conversion module according to claim 24, wherein the conductive structure further comprises two third connection parts and two fourth connection parts, and the two third connection parts and the two fourth connection parts are embedded in at least two sidewalls of the main frame, wherein first end surfaces and second end surfaces of the third connection parts are partially exposed to the first surface and the second surface of the main frame and formed as input positive terminal contact surfaces, and first end surfaces and second end surfaces of the fourth connection parts are partially exposed to the first surface and the second surface of the main frame and formed as output negative terminal contact surfaces.

27. The power conversion module according to claim 26, further comprising a pin layer disposed on the second surface of the main frame, wherein the pin layer has a first surface and a second surface opposed to the first surface, and the pin layer comprises at least one input positive terminal, at least one output positive terminal, at least one output negative terminal, at least one control signal pin and at least one feedback signal pin, which are disposed on the first surface of the pin layer, wherein the at least one input positive terminal is electrically connected with the corresponding input positive terminal contact surface of the conductive structure, the at least one output positive terminal is electrically connected with the corresponding output positive terminal contact surface of the conductive structure, the at least one output negative terminal is electrically connected with the corresponding output negative terminal contact surface of the conductive structure, the at least one control signal pin is electrically connected with the control signal pin contact surface of the conductive structure, and the at least one feedback signal pin is electrically connected with the feedback signal pin contact surface of the conductive structure.

28. The power conversion module according to claim 27, wherein the magnetic device, the circuit board and the pin layer are included in a package structure, and the package structure has a first surface and a second surface opposed to the first surface, wherein the first surface of the package structure is located near the first surface of the circuit board, and the two power components are disposed on the first surface of the package structure.

29. The power conversion module according to claim 27, wherein the magnetic device, the two power components, the circuit board and the pin layer are included in a package structure, and the package structure has a first surface and a second surface opposed to the first surface, wherein the first surface of the package structure is located near the first surface of the circuit board, and the a top surface of each power component is lower than the first surface of the package structure.

30. The power conversion module according to claim 27, further comprising an output capacitor disposed between the magnetic device and the pin layer.

31. The power conversion module according to claim 16, further comprising at least one output capacitor disposed between the power device and the magnetic device.

* * * * *